US011825308B2

(12) United States Patent
Weatherhead et al.

(10) Patent No.: US 11,825,308 B2
(45) Date of Patent: Nov. 21, 2023

(54) SYSTEMS AND METHODS FOR SECURITY OF A HYDROCARBON SYSTEM

(71) Applicant: Sensia LLC, Houston, TX (US)

(72) Inventors: Norman Andrew Weatherhead, Kitchener (CA); Edward Anthony Gray, Olmstead Township, OH (US); Jeffery P. Anderson, Beaumont (CA); Bhargav Ajit Vyas, Thane (IN); Shelby Adam Murrell, Dripping Springs, TX (US); Srikanth G. Mashetty, Houston, TX (US); Vivek Chinta, Houston, TX (US)

(73) Assignee: Sensia LLC, Houston, TX (US)

( * ) Notice: Subject to any disclaimer, the term of this patent is extended or adjusted under 35 U.S.C. 154(b) by 83 days.

(21) Appl. No.: 17/378,303

(22) Filed: Jul. 16, 2021

(65) Prior Publication Data

US 2022/0022041 A1     Jan. 20, 2022

Related U.S. Application Data

(60) Provisional application No. 63/053,557, filed on Jul. 17, 2020.

(51) Int. Cl.
*H04W 12/08* (2021.01)
*H04L 9/32* (2006.01)
*G05B 17/00* (2006.01)

(52) U.S. Cl.
CPC ............ *H04W 12/08* (2013.01); *G05B 17/00* (2013.01); *H04L 9/3228* (2013.01)

(58) Field of Classification Search
CPC .... H04W 12/08; H04W 12/61; H04L 9/3228; H04L 9/088; H04L 2209/805; E21B 43/00
See application file for complete search history.

(56) References Cited

U.S. PATENT DOCUMENTS

| | | | |
|---|---|---|---|
| 9,271,110 B1* | 2/2016 | Fultz | H04W 4/029 |
| 2003/0074139 A1 | 4/2003 | Poedjono | |
| 2006/0130037 A1 | 6/2006 | Mackay | |
| 2009/0062929 A1* | 3/2009 | Takahashi | H04L 12/40013 700/1 |
| 2011/0107322 A1 | 5/2011 | Hashiguchi | |
| 2012/0075059 A1* | 3/2012 | Fyke | G07C 9/00857 340/5.21 |
| 2013/0024542 A1* | 1/2013 | Keller | G05B 19/0428 709/217 |
| 2013/0252583 A1* | 9/2013 | Brown | H04L 63/0807 455/411 |
| 2017/0293896 A1* | 10/2017 | Katayama | G05B 15/02 |
| 2017/0311368 A1 | 10/2017 | Kandur Raja et al. | |

(Continued)

*Primary Examiner* — Robert B Leung
(74) *Attorney, Agent, or Firm* — Foley & Lardner LLP

(57) ABSTRACT

A hydrocarbon control system includes a base device, a field device, and a mobile device. The base device includes a key generator configured to generate a temporary key. The field device is configured to restrict or allow access based on verification of a received key. The mobile device is configured to communicate with the base device to receive the temporary key when in proximity of the base device, communicate with the field device to provide the temporary key to the field device when in proximity of the field device, and exchange data with the field device in response to the field device verifying the temporary key.

20 Claims, 13 Drawing Sheets

(56) References Cited

U.S. PATENT DOCUMENTS

| | | |
|---|---|---|
| 2018/0373781 A1 | 12/2018 | Palrecha |
| 2018/0375953 A1 | 12/2018 | Casassa Mont et al. |
| 2019/0034735 A1 | 1/2019 | Cuban et al. |
| 2019/0052638 A1* | 2/2019 | Agarwal ................ H04L 63/08 |
| 2019/0244129 A1 | 8/2019 | Tabuchi |
| 2020/0182036 A1 | 6/2020 | Rangarajan et al. |
| 2021/0144517 A1 | 5/2021 | Guim Bernat et al. |
| 2021/0409478 A1 | 12/2021 | Choi et al. |

\* cited by examiner

SYSTEMS AND METHODS FOR SECURITY OF A HYDROCARBON SYSTEM

CROSS-REFERENCE TO RELATED PATENT APPLICATION

This application claims the benefit of and priority to U.S. Provisional Application No. 63/053,557, filed Jul. 17, 2020, the entire disclosure of which is incorporated by reference herein.

BACKGROUND

The present disclosure relates to hydrocarbon sites. More specifically, the present disclosure relates to networks or control systems for hydrocarbon sites including but not limited to control systems using edge devices in industrial systems, such as gas and oil extraction stations.

SUMMARY

One implementation of the present disclosure is a hydrocarbon control system, according to some embodiments. In some embodiments, the hydrocarbon control system includes a base device, a field device, and a mobile device. In some embodiments, the base device includes a key generator configured to generate a temporary key. In some embodiments, the field device is configured to restrict or allow access based on verification of a received key. In some embodiments, the mobile device is configured to communicate with the base device to receive the temporary key when in proximity of the base device, communicate with the field device to provide the temporary key to the field device when in proximity of the field device, and exchange data with the field device in response to the field device verifying the temporary key.

In some embodiments, the field device is positioned remotely from the base device and does not communicate directly with the base device.

In some embodiments, the temporary key is configured allow access by the user to the field device for a timed duration.

In some embodiments, the temporary key is any of a time based key, a token key, or a secret based key.

In some embodiments, the field device includes a graphical representation of data. In some embodiments, the mobile device is configured to scan the graphical representation of data to establish communication between the field device and the mobile device to facilitate verification of the temporary key and the exchange of data with the field device.

In some embodiments, the mobile device includes a proprietary application. In some embodiments, the proprietary application configures the mobile device to communicate wirelessly with the field device and the base device.

In some embodiments, the temporary key is generated using an algorithm and an input from an edge device of the hydrocarbon control system.

In some embodiments, the temporary key is configured to at least one of allow the mobile device to download data from the field device onto the mobile device, allow a user to view data of the field device via the mobile device, or allow the user to modify data of the field device via the mobile device.

Another implementation of the present disclosure is a method for providing temporary access to a field device of a hydrocarbon system, according to some embodiments. In some embodiments, the method includes receiving a request for a temporary key from a mobile device at a base device when the mobile device is in communications proximity with the base device. In some embodiments, the method includes providing the temporary key by the base device to the mobile device in response to the request. In some embodiments, the method includes providing the temporary key to the field device by the mobile device when the mobile device is in communications proximity of the field device. In some embodiments, the method includes verifying the temporary key at the field device and exchanging data between the field device and the mobile device in response to verification of the temporary key.

In some embodiments, the request for the temporary key includes an ID of a technician of the mobile device. In some embodiments, the base device is configured to generate the temporary key based on the ID of the technician to provide an appropriate access level for the technician of the mobile device.

In some embodiments, the temporary key is configured to at least one of allow the mobile device to download data from the field device onto the mobile device, allow the technician to view data of the field device via the mobile device, or allow the technician to modify data of the field device via the mobile device.

In some embodiments, the field device is positioned remotely from the base device and does not communicate directly with the base device.

In some embodiments, the temporary key is configured to allow access by the technician to data of the field device for a timed duration.

In some embodiments, the temporary key is any of a time based key, a token key, or a secret based key.

In some embodiments, the field device includes a graphical representation of data. In some embodiments, the method further includes scanning the graphical representation of data of the field device with the mobile device to establish wireless communication between the field device and the mobile device, and performing the steps of providing the temporary key, verifying the temporary key, and exchanging data between the field device and the mobile device in response to scanning the graphical representation of data and establishing wireless communication between the field device and the mobile device.

In some embodiments, the mobile device includes a proprietary application. In some embodiments, the proprietary application configures the mobile device to communicate with the field device and the base device.

Another implementation of the present disclosure is a field device for a hydrocarbon site, according to some embodiments. In some embodiments, the field device includes processing circuitry configured to establish wireless communication between the field device and a mobile device. In some embodiments, the processing circuitry is configured to obtain a temporary key from the field device, the temporary key being provided to the field device previously by a base device of the hydrocarbon site. In some embodiments, the processing circuitry is configured to verify the temporary key and determine an access for a user of the mobile device based on the temporary key. In some embodiments, in response to the temporary key being verified, the processing circuitry is configured to send data to the mobile device for a limited time duration.

In some embodiments, the field device includes a quick response (QR) code. In some embodiments, the QR code is scannable by the mobile device to initiate the step of establishing wireless communication between the field device and the mobile device.

In some embodiments, the temporary key is generated using an algorithm and an input from an edge device.

In some embodiments, the data sent to the mobile device includes any of configuration data, diagnostic data, troubleshooting data, or operational data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a hydrocarbon site may be operated, controlled, monitored, or served by a control system including various edge devices. The edge devices communicate with a cloud computing system, according some embodiments. In some embodiments, the control system is configured to detect configuration changes in the control system. In some embodiments, the control system is configured to manage various dependencies of applications that are run by the edge devices. In some embodiments, the control system is configured to define and use resource requirements to facilitate proper resource use by applications of the edge devices. In some embodiments, the control system is configured to implement a configuration tool to automatically present required parameters for an application by leveraging self-descriptions of required configuration parameters of the applications. In some embodiments, the control system is configured to package applications for edge devices that have separate processors. In some embodiments, the control system is configured to generate temporary access keys to facilitate timed access to field devices of the control system by a technician (e.g., through the technician's mobile device). In some embodiments, the control system is configured to balance various loads of the system. In some embodiments, the control system is configured to assess quality of metadata of various assets of the control system. In some embodiments, the control system is configured to periodically backup and restore application state, configuration, and learning at the edge devices.

System Overview

Hydrocarbon Site

Figure 1:
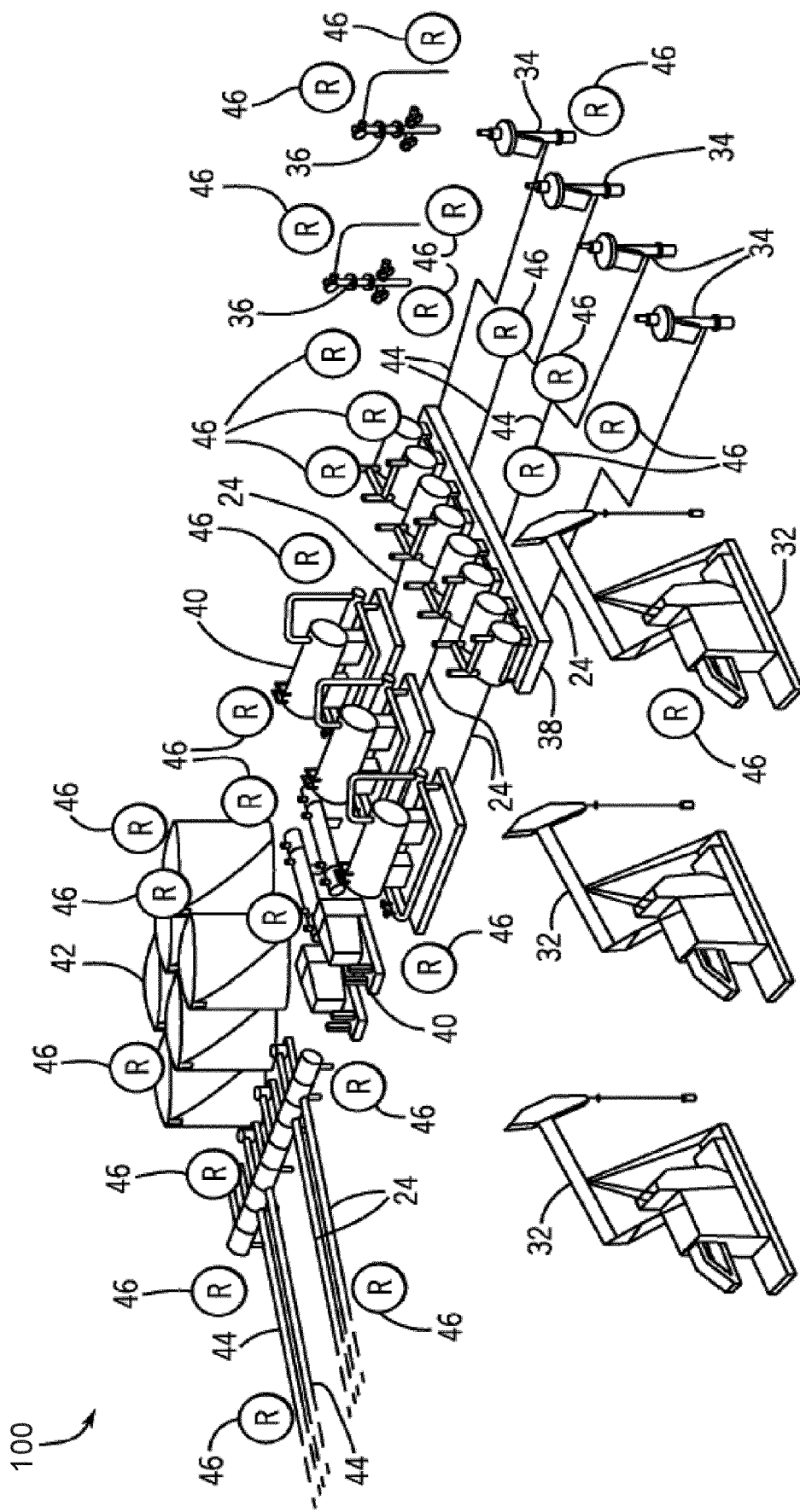
FIG. 1 is a perspective view of a hydrocarbon site equipped with well devices, according to some embodiments.

Referring now to FIG. 1, a hydrocarbon site 100 may be an area in which hydrocarbons, such as crude oil and natural gas, may be extracted from the ground, processed, and stored. As such, the hydrocarbon site 100 may include a number of wells and a number of well devices that may control the flow of hydrocarbons being extracted from the wells. In one embodiment, the well devices at the hydrocarbon site 100 may include any device equipped to monitor and/or control production of hydrocarbons at a well site. As such, the well devices may include pumpjacks 32, submersible pumps 34, well trees 36, and other devices for assisting the monitoring and flow of liquids or gasses, such as petroleum, natural gasses and other substances. After the hydrocarbons are extracted from the surface via the well devices, the extracted hydrocarbons may be distributed to other devices such as wellhead distribution manifolds 38, separators 40, storage tanks 42, and other devices for assisting the measuring, monitoring, separating, storage, and flow of liquids or gasses, such as petroleum, natural gasses and other substances. At the hydrocarbon site 100, the pumpjacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 100 via the network of pipelines 44.

The pumpjack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pumpjacks 32, the submersible pumps 34, and the well trees 36, such that the collected hydrocarbons may be routed to various hydrocarbon processing or storage areas in the hydrocarbon site 100.

The separator 40 may include a pressure vessel that may separate well fluids produced from oil and gas wells into separate gas and liquid components. For example, the separator 40 may separate hydrocarbons extracted by the pumpjacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 100 to monitor or provide information related to certain aspects of the hydrocarbon site 100. As such, the monitoring system may be a controller, a remote terminal unit (RTU), or any computing device that may include communication abilities, processing abilities, and the like. For discussion purposes, the monitoring system will be embodied as the RTU 46 throughout the present disclosure. However, it should be understood that the RTU 46 may be any component capable of monitoring and/or controlling various components at the hydrocarbon site 100. The RTU 46 may include sensors or may be coupled to various sensors that may monitor various properties associated with a component at the hydrocarbon site 10.

The RTU 46 may then analyze the various properties associated with the component and may control various operational parameters of the component. For example, the RTU 46 may measure a pressure or a differential pressure of a well or a component (e.g., storage tank 42) in the hydrocarbon site 100. The RTU 46 may also measure a temperature of contents stored inside a component in the hydrocarbon site 100, an amount of hydrocarbons being processed or extracted by components in the hydrocarbon site 100, and the like. The RTU 46 may also measure a level or amount of hydrocarbons stored in a component, such as the storage tank 42. In certain embodiments, the RTU 46 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-1O Flexible 1/0 Transmitter manufactured by vMonitor® of Houston, Tex.

In one embodiment, the RTU 46 may include a sensor that may measure pressure, temperature, fill level, flow rates, and the like. The RTU 46 may also include a transmitter, such as a radio wave transmitter, that may transmit data acquired by the sensor via an antenna or the like. The sensor in the RTU 46 may be wireless sensors that may be capable of receive and sending data signals between RTUs 26. To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4X container, a NEMA 7X container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 100 without being physically located near the corresponding components. The RTU 46 can be configured to communicate with the devices at the hydrocarbon site 100 as well as mobile computing devices via various networking protocols.

In operation, the RTU 46 may receive real-time or near real-time data associated with a well device. The data may include, for example, tubing head pressure, tubing head temperature, case head pressure, flowline pressure, wellhead pressure, wellhead temperature, and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead 30, key performance indicators (KPis) associated with the wellhead 30, wellhead performance summary reports, and the like. Although the RTU 46 may be capable of performing the above-referenced analyses, the RTU 46 may not be capable of performing the analyses in a timely manner. Moreover, by just relying on the processor capabilities of the RTU 46, the RTU 46 is limited in the amount and types of analyses that it may perform. Moreover, since the RTU 46 may be limited in size, the data storage abilities may also be limited.

In certain embodiments, the RTU 46 may establish a communication link with the cloud-based computing system 12 described above. As such, the cloud-based computing system 12 may use its larger processing capabilities to analyze data acquired by multiple RTUs 26. Moreover, the cloud-based computing system 12 may access historical data associated with the respective RTU 46, data associated with well devices associated with the respective RTU 46, data associated with the hydrocarbon site 100 associated with the respective RTU 46 and the like to further analyze the data acquired by the RTU 46. The cloud-based computing system 12 is in communication with the RTU via one or more servers or networks (e.g., the Internet).

Site Control System

Figure 2:
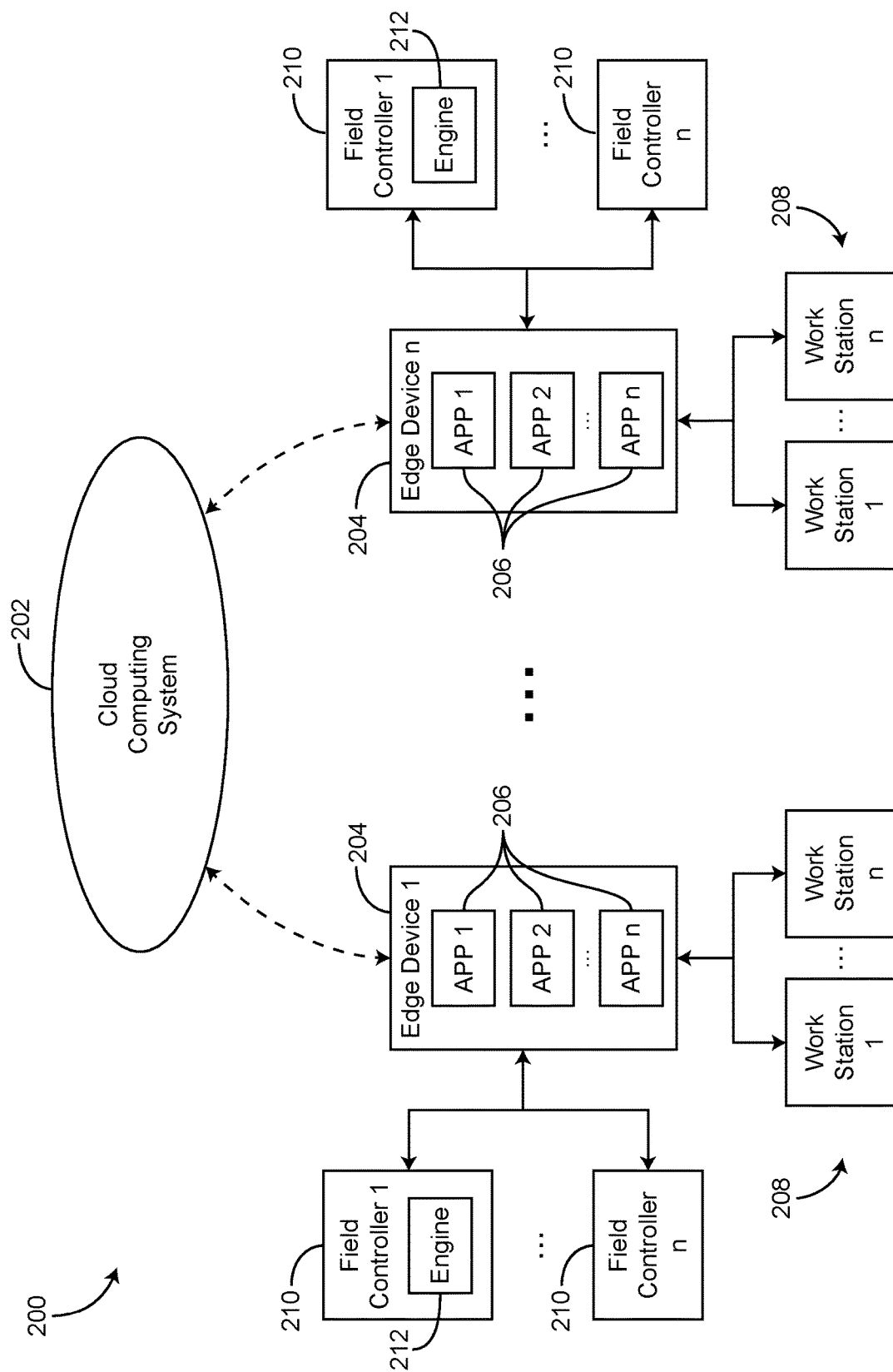
FIG. 2 is a block diagram of a control system for the hydrocarbon site of FIG. 1, according to some embodiments.

Referring particularly to FIG. 2, a control system 200 (e.g., a network) for hydrocarbon site 100 is shown, according to some embodiments. In some embodiments, control system 200 includes or is configured to communicate with cloud computing system 202 and is configured to control various operations of a well site (e.g., hydrocarbon site 100) based on analyzing metadata from various devices within control system 200. Cloud computing system 202 may include any processing circuitry, processors, memory, etc., or combination thereof that are positioned remotely from hydrocarbon site 100. In various embodiments, some or all of the processing circuitry, processors, memory, etc., or combination thereof within cloud computing system 202 may be performed by various devices disclosed within control system 200. Control system 200 is further shown to include edge devices 204, and workstations 208, and field controllers 210.

Edge devices 204 may be configured to run, perform, implement, store, etc., one or more applications 206 thereof. Additionally, some or all processing circuitry, processors, memory, etc. included in various devices within control system 200 (e.g., edge device 204, field controller 210, workstation 208, etc.) may be distributed across several other devices within control system 200 or integrated into a single device. Edge device(s) 204 may be configured to receive data from field controller(s) 210 and provide data analytics to cloud computing system 202 based on the received data. This is described in greater detail below with reference to FIG. 3.

In some embodiments, each edge device 204 includes a processing circuit having a processor and memory. The processor can be a general purpose or specific purpose processor, an application specific integrated circuit (ASIC), one or more field programmable gate arrays (FPGAs), a group of processing components, or other suitable processing components. The processor is configured to execute computer code or instructions stored in the memory or received from other computer readable media (e.g., CDROM, network storage, a remote server, etc.), according to some embodiments.

In some embodiments, the memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuitry and can include computer code for executing (e.g., by the processor) one or more processes described herein.

Field controllers 210 may be configured to control various operations at a well site and are communicably coupled with edge devices 204. In some embodiments, field controllers 210 are configured to operate (e.g., provide control signals to, provide setpoints to, adjust setpoints or operational parameters thereof) field equipment (e.g., electric submersible pumps (ESPs), cranes, pumps, etc.) of hydrocarbon site 100. Field controllers 210 may be grouped into different sets based on which edge device 204 field controller 210 communicate with. In some embodiments, edge device(s) 204 are configured to exchange any sensor data, measurement data, meter data (e.g., flow meter data), control signals, storage data, maintenance data, setpoint adjustments, operational adjustments, diagnostic data, analytics data, meta data, etc., with field controllers 210. It should be understood that each edge device 204 can be associated with, corresponding to, etc., multiple field controllers 210. In some embodiments, the meta data may include a description of the equipment or name of the equipment, a communication identification, a port identification, unit value identification, range identification, type of signal (e.g., analog or digital), hierarchy of the data, identification of data or sensors redundant to the data or sensor providing the data, etc.

In some embodiments, one or more of field controllers 210 can include a computing engine 212. Computing engine 212 can be configured to perform various control, diagnostic, analytic, reporting, meta data-related, etc., functions. Computing engine 212 can be embedded in one or more of field controller 210, or may be embedded at one or more of edge devices 204. In some embodiments, any of the functionality of computing engine 212 is distributed across multiple edge devices 204 and/or multiple field controllers 210. In some embodiments, any of the functionality of computing engine 212 is performed by cloud computing system 202.

Still referring to FIG. 2, workstations 208 may be configured to receive user instructions for controlling hydrocarbon site 100 and provide control signals to various devices via control system 200. Workstations 208 can include any desktop computer, laptop computer, personal computer device, user interface, personal computer device, etc., or any general computing device thereof. In some embodiments, multiple workstations 208 (e.g., an n number of workstations 208) are associated with each edge device 204, while in other embodiments, one or more of edge devices 204 are associated with a single workstation 208.

In some embodiments, field controller(s) 210 may be configured to act as edge devices such that field controller(s) 210 perform additional processing (e.g., data analysis, mapping, etc.) prior to providing information to cloud computing system 202. In some embodiments, this decreases latency in information processing to cloud computing system 202. In other embodiments, edge device(s) 204 operate as traditional edge devices and perform significant storage and processing within control system 200 (e.g., on-site, at/near hydrocarbon site 100, etc.) to mitigate latency due to processing information in cloud computing system 202.

Field Controller

Figure 3:
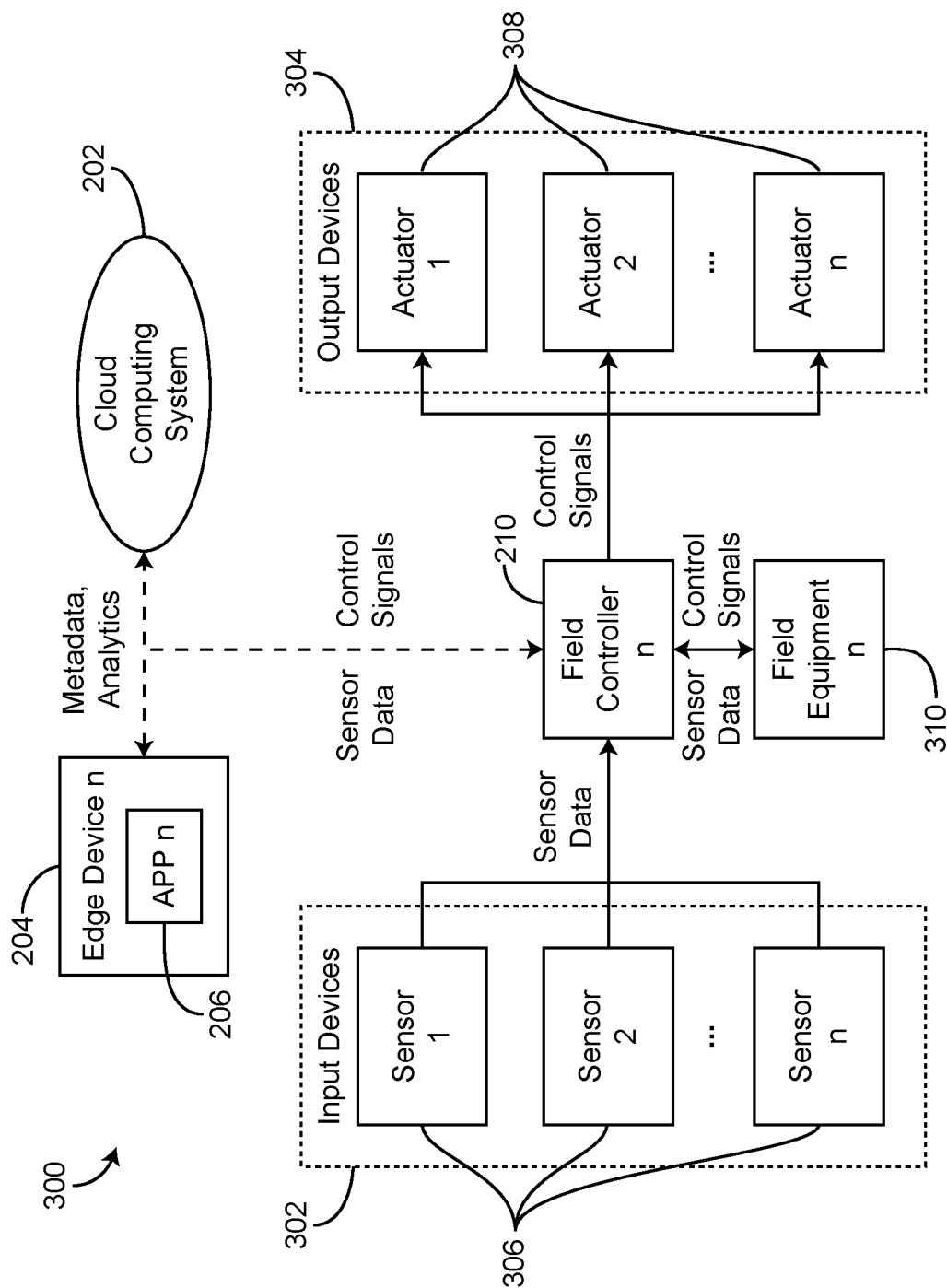
FIG. 3 is a block diagram of a portion of the control system of FIG. 2, showing a field controller communicating with field equipment, input devices, and output devices, according to some embodiments.

Referring now to FIG. 3, control system 200 for performing control of output devices 304 based on input devices 302 is shown, according to exemplary embodiments. Control system 200 is shown to include edge device 204 including application 206, cloud computing system 202, field controller 210, field equipment 310, input devices 302, and output devices 304.

Input devices 302 may be configured to provide various sensor data and/or field measurements from hydrocarbon site 100 to field controller 210 for processing. For example, Sensor 306 of input devices 302 is measuring the pump speed of pump 34. Sensor 306 provides the pump speed of pump 34 to field controller 210 at regular intervals (e.g., continuously, ever minute, every 5 minutes, etc.). Input devices 302 may be connected wired or wirelessly to field controller 210 or any other device within system 200 (e.g., edge device 204). In some embodiments, input devices 302 are coupled to various site equipment (e.g., pumps, pumpjacks, cranes, etc.) and provide operational data of their respective site equipment to field controller 210.

Output devices 304 may be configured to receive control signals from field controller 210 and adjust operation based on the received control signals. For example, field controller 210 determines that pump 34 is operating at a lower pump speed than is considered optimal. Field controller 210 subsequently sends a control signal to actuator 304 to increase pump speed for pump 34. In some embodiments, output devices 304 are configured to act as any device (e.g., actuator, etc.) capable of adjusting operation of site equipment within hydrocarbon site 100. In some embodiments, various other field equipment (e.g., field equipment 310) include some or all of the functionality of input devices 302 and output devices 304 and provide sensor data and receive control signals from field controller 210.

In some embodiments, control system 200 is configured to analyze various sets of data (e.g., metadata) to determine control schema that is optimal for hydrocarbon site 100. A significant amount of processing for this may be performed by edge devices (e.g., edge device 204), instead of processing all metadata analytics in the cloud, as processing the data in on-site or proximate edge devices can decrease latency compared to sending the data to cloud computing system 202 for processing. For example, sensors 306 provide metadata to field controller 210. Field controller 210 processes the data to determine the type of data and/or domain from which the data is received and provides the data to edge device 204 for analytics. An application within edge device 204 (e.g., application 206) may analyze the metadata to make decisions about the control schema that would have been otherwise unnoticed by processing within control system 200. For example, application 206 may infer that the data received has been received by a flow meter sensor (e.g., sensor (1) 306), based on the patterns seen in the data and a priori data that edge device 204 has analyzed. Application 206 may make inferences, predictions, and calculations based on current and/or past data.

In some embodiments, application 206 provides some or all of the data to cloud computing system 202 for further processing. Application 206 may be configured to make inferences about received data that improves the standardization of data analytics. For example, sensor (1) 306 and sensor (2) 306 may be flow sensors, but from different vendors. As such, sensor (1) 306 may provide data to field controller 210 in a different format than sensor (2) 306. However, application 206 of edge device 204 may still be able to standardize the data and determine that both sets of data are from flow sensors, despite the received data being in different formats (e.g., one data set is provided under resource description framework (RDF) specifications, one data set is provided as data objects, etc.). In various embodiments, allowing edge device 204 to perform some or all of the metadata analytics allows for improved data analytics and control schema without significantly increasing processing latency.

Configuration Change Detection

Figure 4:
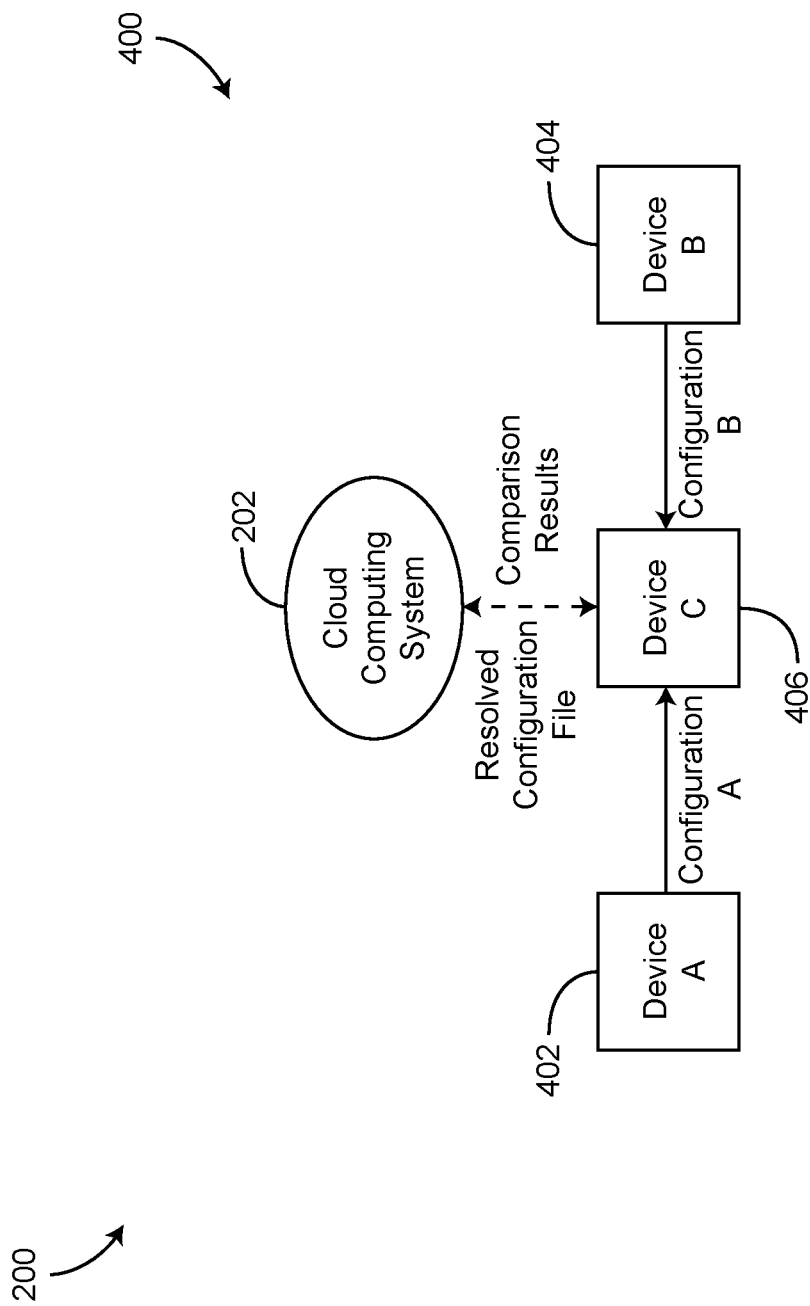
FIG. 4 is a block diagram of a portion of the control system of FIG. 2 showing devices configured to identify configuration changes in the control system, according to some embodiments.

Referring particularly to FIG. 4, a portion 400 of system 200 is shown, according to some embodiments. The portion 400 of system 200 includes a first device 402 (e.g., device A, one of edge devices 204, one of field controllers 210, one of workstations 208, etc.), a second device 404 (e.g., device B, another one of edge devices 204, another one of field controllers 210, another one of workstations 208, etc.), and a third device 406 (e.g., device C, another one of edge devices 204, another one of field controllers 210, another one of workstations 208, etc.). In some embodiments, the first device 402 is configured to provide a first configuration (e.g., a first configuration file, first configuration data, a collection of hashes, metadata configuration information, etc.), shown as configuration A to the third device 406, and the second device 404 is configured to provide a second configuration (e.g., a second configuration file, second configuration data, a collection of hashes, metadata configuration information, etc.) to the third device 406.

In some embodiments, configuration A and configuration B are obtained, more generally, from different parts of system 200 (e.g., different devices, components, sub-components, controllers, field controllers, edge devices, etc.), in response to a user changing a configuration of control system 200 (e.g., connecting a new device, re-arranging a configuration of devices, adjusting dependencies of various software, applications, etc., of the devices, disconnecting a device, etc.). In this way, reception of configuration A and configuration B may be event-driven. In some embodiments, reception of configuration A and configuration B is performed periodically or on demand (e.g., when a user or technician requests a configuration check). In some embodiments, configuration A and configuration B are configuration files of control system 200 at different points in time.

In some embodiments, the third device 406 is configured to compare configuration A and configuration B to determine any differences between configuration A and configuration B. Configuration A and configuration B can each include multiple hashes (e.g., a collection of cryptographic signatures, non-cryptographic signatures, etc., of the configuration of devices of control system 200). The third device 406 can compare the hashes at a comparison granularity to determine if configuration A and configuration B are different (e.g., if the hashes do not match) or to determine if configuration A and configuration B are the same (e.g., if the hashes match).

In some embodiments, the third device 406 is configured to generate comparison results when performing the comparison between configuration A and configuration B. The third device can provide the comparison results, configuration A, and configuration B to cloud computing system 202 for further analysis, processing, etc., to determine a resolved configuration file, to determine which of configuration A or configuration B should be used, or to determine feasibility of configuration dates. In some embodiments, the first device 402 and the second device 404 are configured to provide configuration A and configuration B, respectively, to cloud computing system 202, and cloud computing system 202 is configured to perform any of the functionality of third device 406 to perform the comparison.

In some embodiments, if the configuration A and the configuration B do not match (e.g., as determined by performing the comparison described herein), the configuration A and configuration B can be assessed to determine which of the configuration A and the configuration B should be used, or to merge the configuration A and the configuration B into a new configuration. In some embodiments, one or more conflict resolution techniques are performed by the third device 406 or the cloud computing system 202 to determine a merged or resolved configuration file. The conflict resolution techniques can include one or more rules used to determine, individually or in combination, which of the configuration A or the configuration B should be used (e.g., the resolved configuration).

In some embodiments, the resolved configuration is determined by tracking sources of the configuration A and the configuration B and/or authors of the configuration changes. For example, the configuration A can be traced to a particular device of the system 200 and a user (e.g., the author of the configuration A) of the particular device. Similarly, the configuration B can be traced to a different particular device of the system 200 and a user (e.g., the author of the configuration B) of the different particular device. In some embodiments, the sources of the configuration A and the configuration B are traced to particular devices of the system 200, while in some embodiments the sources of the configuration A and the configuration B are traced to a particular hierarchy or level of the devices at which the configurations A and B originate.

In some embodiments, the one or more rules of the conflict resolution techniques include tracking a timestamp of the configuration A and the configuration B. For example, if the configuration A is provided at a time t-2 and the configuration B is provided at a time t-1, the more recent of the two (i.e., configuration B) may be used as the resolved configuration.

In some embodiments, the one or more rules of the conflict resolution techniques include using a privilege group or a rights level of the configurations to determine the resolved configuration. For example, if the configuration A is provided by a user with normal permissions whereas the configuration B is provided by an administrator with administrative permissions, and the configuration A and the configuration B are in conflict, the configuration B may be used. Similarly, a field technician may have permissions to override configuration changes provided by a regular user.

In some embodiments, the resolved configuration is a merged configuration of the configuration A and the configuration B. In some embodiments, the merged configuration is determined based on at least the configuration A and the configuration B using a combination of any of the conflict resolution techniques or one or more rules as described herein at different levels. For example, at a global level, one of the configurations A and B may be selected as the resolved configuration. In some embodiments, the configuration A and the configuration B are merged at different hierarchical levels. For example, the configuration A and the configuration B can be merged at a certain device level (e.g., device importance, a tag associated with each device indicating a hierarchical position of each device, etc.) and below using any of, or any combination of the conflict resolution techniques described herein. In some embodiments, the configuration A and the configuration B are merged at an itemized or individual level. For example, if a field technician updates one or more operating parameters of a device of the system 200 (configuration A) and this conflicts with a configuration B that updates software at a different device, the configurations A and B can be merged so that the resolved configuration includes both the updates of the one or more operating parameters of the device, and the updated software at the different device in an itemized or individual manner.

Figure 5:
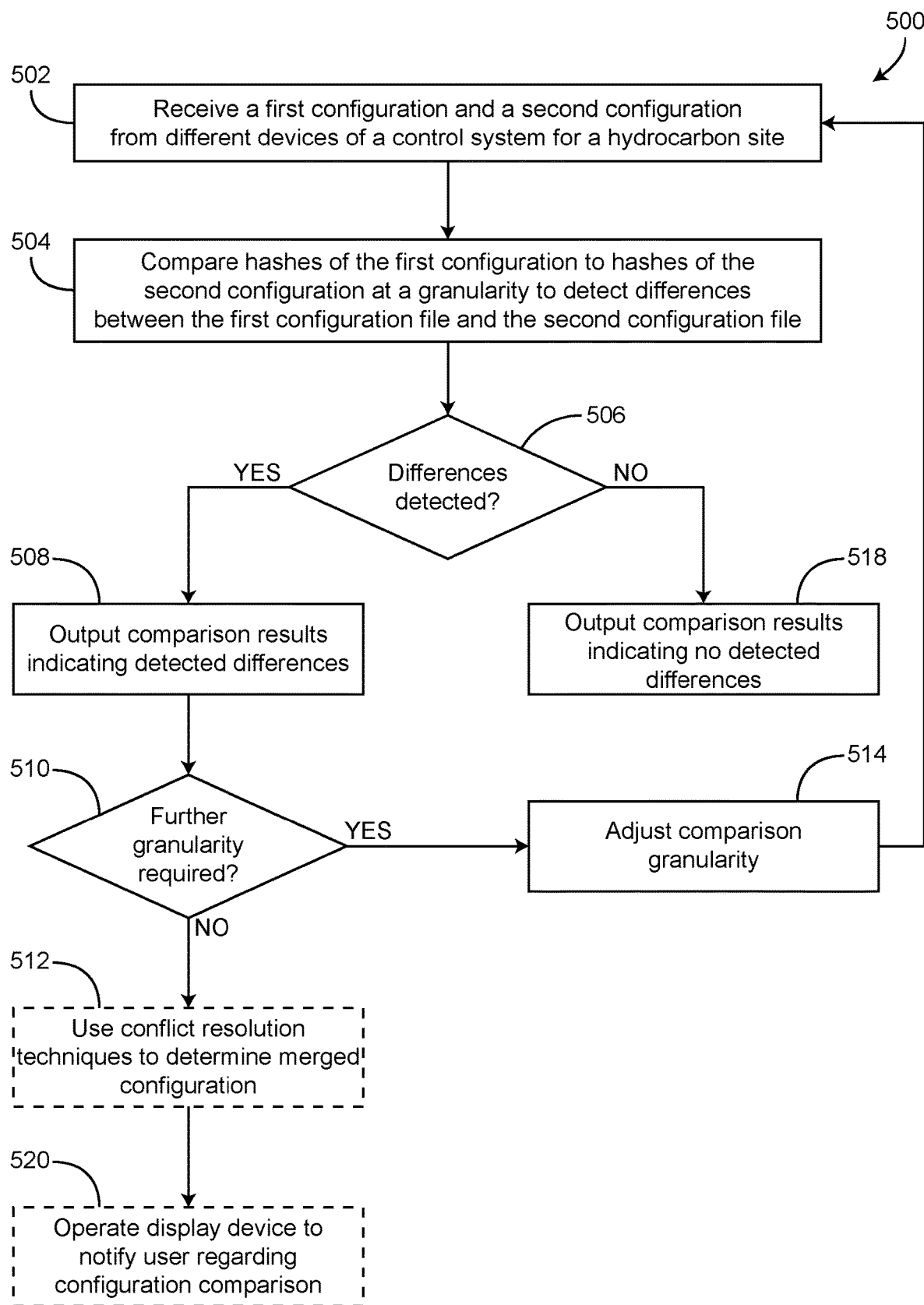
FIG. 5 is a flow diagram of a process for identifying and resolving configuration changes in the control system of FIG. 2, according to some embodiments.

Referring particularly to FIG. 5, a flow diagram of a process 500 for determining conflicts in configuration updates and maintaining proper or functional configuration of control system 200 is shown, according to some embodiments. Process 500 includes steps 502-516 and can be performed by the portion 400 of control system 200 (shown in FIG. 4), cloud computing system 202, one or more edge device(s) 204 of control system 200, or more generally, by control system 200. Advantageously, performing process 500 can facilitate maintaining proper dependencies between various devices, software, applications, etc., of control system 200. Performing process 500 can also advantageously facilitate detection of infeasible configuration updates, and resolution of such infeasible configuration updates.

Process 500 includes receiving a first configuration and a second configuration from different devices of a control system for a hydrocarbon site (step 502), according to some embodiments. In some embodiments, step 502 is performed periodically (e.g., such that the first configuration and the second configuration are provided and received in response to a query), in response to an event (e.g., installing new equipment, adjustments to the configuration of the control system, when a new device is brought online, when a device is taken offline, etc.), or in response to a user/technician request to check the configuration of the control system). In some embodiments, the control system is control system 200 as described in greater detail above with reference to FIGS. 1-4. In some embodiments, step 502 is performed by one of edge devices 204 of control system 200, cloud computing system 202 of control system 200, etc., or any other suitable processor, processing circuitry, controller, etc. (e.g., locally positioned, remotely positioned, distributed across remote and local processing circuitry, etc.). In some embodiments, the first configuration and the second configuration are provided as configuration files. The configuration files may indicate software or application dependencies, equipment arrangements, equipment dependencies, etc., or other various metadata indicating relationships between components, sub-components, application data transfer (e.g., inputs and/or outputs), etc., of control system 200.

Process 500 includes comparing hashes (or bytes) of the first configuration to hashes of the second configuration at a granularity to detect (e.g., sense, determine, etc.) differences between the first configuration and the second configuration (step 504), according to some embodiments. In some embodiments, step 504 is performed by the device or processing circuitry (e.g., one of edge devices 204, cloud computing system 202, third device 406, etc.) that performs step 502 (e.g., the device that receives the configurations from different sides of the control system 200). In other embodiments, the first configuration and the second configuration are provided to other processing circuitry (e.g., cloud computing system 202) that is configured to perform the comparison of step 504. In some embodiments, the comparison is performed at the granularity (e.g., a comparison granularity) indicating an amount or size of data that is selected from the first configuration and the second configuration to be compared. For example, the granularity may be a number of bites of the first configuration file and the second configuration file that are compared in step 504. In some embodiments, step 504 includes comparing different portions or segments of the first configuration file and the second configuration file to each other to determine if the compared portions of the first configuration file and the second configuration file match. In some embodiments, step 504 includes generating results of the comparison to indicate which, if any, of the different segments of the first configuration and the second configuration do not match. For example, step 504 can include dividing the first configuration, A into multiple sub-sections of data (e.g., $a_1, a_2, \ldots, a_n$) and dividing the second configuration, B into a same number of multiple sub-sections of data (e.g., $b_1, b_2, \ldots, b_n$) and comparing corresponding portions of each of the sub-sections to each other (e.g., comparing $a_1$ to $b_1$, comparing $a_2$ to $b_2, \ldots,$ comparing $a_n$ to $b_n$, etc.). In some embodiments, each of the multiple sub-sections of data include a number of bytes that corresponds to the granularity of the comparison.

In some embodiments, step 504 includes generating results indicating whether the various comparisons at the granularity are identical (e.g., if $a_1$ and $b_1$ are identical, if $a_2$ and $b_2$ are identical, etc.,) or if the various comparisons of the different sub-sections of data of the first configuration and the second configuration differ (e.g., if $a_1$ and $b_1$ differ in some way, if $a_2$ and $b_2$ differ in some way, etc.). In this way, performing step 504 can output a vector or multiple results of various sub-comparisons of the different segments of the first configuration and the second configuration (e.g., indicating whether the comparisons indicate that the segments of the first configuration and the second configuration are identical, or which of the segments differ).

Process 500 includes determining if any differences are detected in the comparisons between the first configuration and the second configuration (step 506), according to some embodiments. In some embodiments, step 506 is performed by cloud computing system 202 and/or the third device 406 (or by any other processor, processing circuitry, controller, etc., of control system 200). In some embodiments, step 506 includes determining if any of the sub-comparisons (e.g., if any of the sub-sections of data of the first configuration and the second configuration) differ. For example, if any of the sub-sections of data of the first configuration and the second configuration differ (step 506, "YES"), process 500 proceeds to step 508. Likewise, if none of the sub-sections of data of the first configuration and the second configuration differ (step 506, "NO"), process 500 proceeds to step 518.

Process 500 includes outputting comparison results indicating any detected differences (step 508), according to some embodiments. In some embodiments, step 508 includes operating a display device to provide a visual indication to a user regarding one or more detected differences between the first configuration and the second configuration. In some embodiments, step 508 includes providing the comparison results to cloud computing system 202.

Process 500 includes determining if additional granularity is required (step 510), according to some embodiments. In some embodiments, step 510 is performed to determine if additional comparisons should be performed at an adjusted granularity (e.g., at a finer level). If additional granularity is required (step 510, "YES"), process 500 proceeds to step 514. If additional comparisons at a finer granularity are not required (step 510, "NO"), process 500 proceeds to step 512.

Process 500 includes adjusting the comparison granularity (step 514), according to some embodiments. In some embodiments, step 514 includes increasing a granularity (e.g., decreasing a number of bytes of the first configuration and the second configuration that are compared, thereby increasing a number of sub-sections of the data that are compared and provider a finer resolution of comparison) by a predetermined amount and returning to step 502 in response to adjusting the granularity. Process 500 can then re-perform steps 502-508.

Process 500 includes using conflict resolution techniques to determine a merged configuration (step 512), according to some embodiments. In some embodiments, step 512 is performed by cloud computing system 202. In some embodiments, step 512 is performed using a set of rules to determine which of first configuration or second configuration to select as the merged configuration. In some embodiments, step 512 includes combining the first configuration and the second configuration into the merged configuration. In some embodiments, step 512 is optional. In some embodiments, the one or more conflict resolution techniques are used to select one of the various configurations as the merged configuration (e.g., a global configuration). In some embodiments, the one or more conflict resolution techniques are used to merge the first and second configurations at a hierarchical level (e.g., configuration updates for devices at or below a specific level should be merged), or at an individual or itemized level. In some embodiments, the one or more conflict resolution techniques include determining the merged or a resolved configuration based on a source and/or author of the first and second configurations, a timestamp of the first and second configurations, and/or a rights level of the authors of the first and second configurations. It should be understood that while the process 500 described herein uses only two configurations, any number of configurations can be merged, compared, etc., and the process 500 is not limited to only a first configuration and a second configuration.

Process 500 includes operating a display device to notify a user (e.g., a technician) regarding the configuration comparison (step 520), according to some embodiments. Step 520 can be performed by any of workstations 208 of control system 200. In some embodiments, the notification indicates to a user if a requested configuration change is infeasible or in conflict. In some embodiments, the notification indicates if the user should change a configuration of control system 200.

It should be understood that while process 500 as described herein uses an adjustable granularity for the comparison, a predetermined or fixed comparison granularity may also be used. For example, the granularity may be a preset number of bytes of the first configuration and the second configuration that are compared when performing process 500. Advantageously, process 500 can be performed when a user requests a configuration change to determine if the configuration change is feasible and provide a notification to the user regarding the feasibility or infeasibility of the requested configuration change.

Dependency Management

Figure 6:
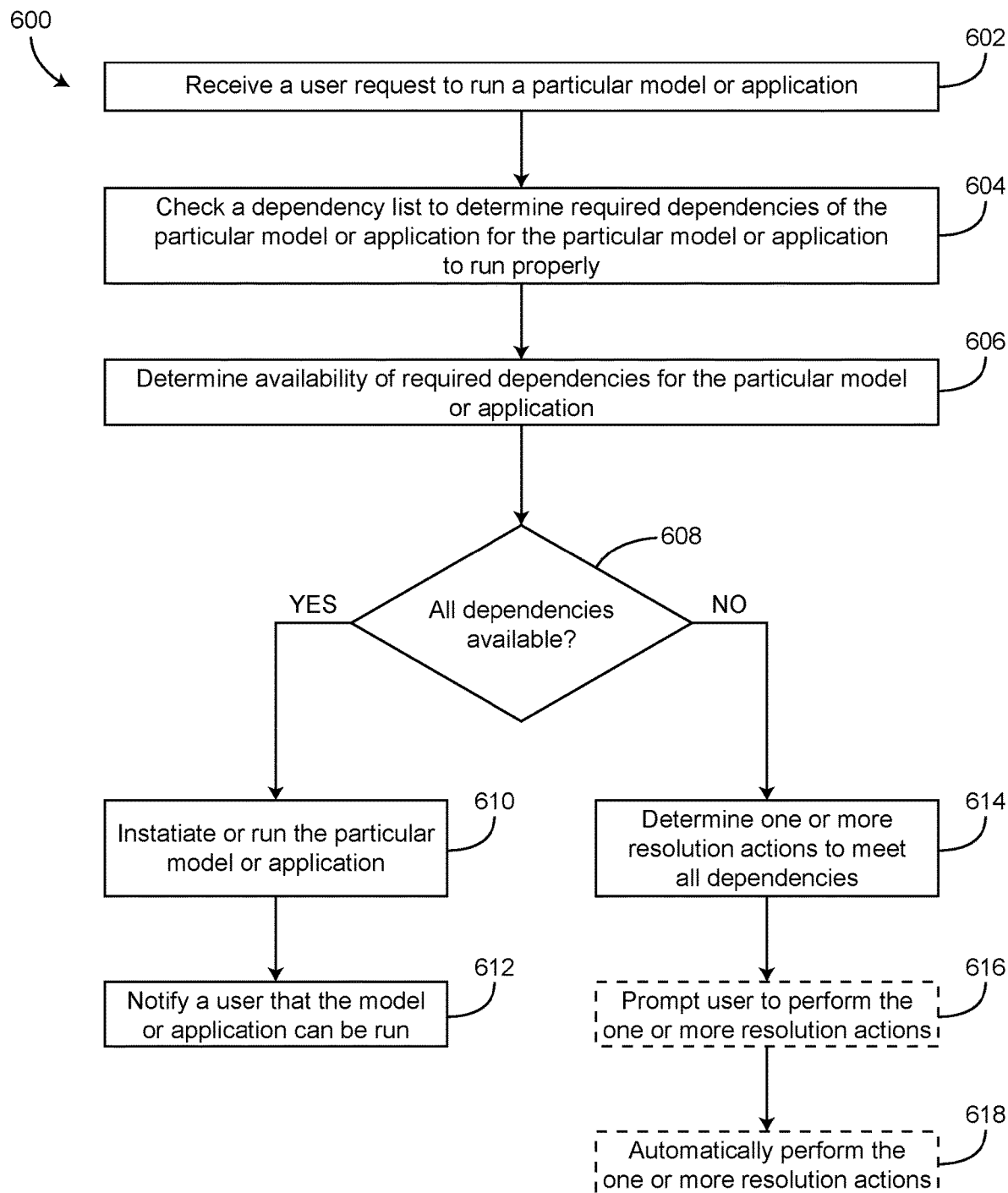
FIG. 6 is a flow diagram of a process for managing dependencies of applications or models for edge devices of the control system of FIG. 2, according to some embodiments.

Referring particularly to FIG. 6, a process 600 for managing dependencies of various applications (e.g., applications 206) or models for various edge devices 204 of control system 200 is shown, according to some embodiments. Process 600 includes steps 602-618 and can be performed by control system 200 (e.g., by one or more of the edge devices 204, one or more of the workstations 208, and/or the cloud computing system 202).

Process 600 includes receiving a user request to run a particular model or application (step 602), according to some embodiments. In some embodiments, step 602 is performed by workstations 208. Step 602 can include receiving a user initiated request, or a system initiated request to run or instantiate a particular model or application at one of edge devices 204. For example, the model may be a particular model that is used by an application, or used to determine various parameters of control system 200 or of hydrocarbon site 100. In some embodiments, the application that is requested to be instantiated is an event detector.

Process 600 includes checking a dependency list to determine required dependencies of the particular model or application for the model or application to run properly (step 604), according to some embodiments. In some embodiments, step 604 is performed by one of edge devices 204 at which the particular model or application will be implemented. In some embodiments, the dependency list is stored in a centralized location that can be accessed by various devices (e.g., edge devices 204) of control system 200. In some embodiments, the dependency list is stored at one or more edge devices 204 of control system 200. In some embodiments, the dependency list indicates various required data inputs and/or data outputs for the application or model to run properly. In some embodiments, the dependency list is obtained based on metadata for the application or model.

Process 600 includes determining an availability of required dependencies for the particular model or application (step 606) as determined in step 604, according to some embodiments. In some embodiments, step 606 is performed by the edge device 204 on which the model or application will be implemented. Step 606 can include determining if all required data inputs for the model or application are available. For example, if the particular model or application requires a specific flow meter input, step 606 may include determining (e.g., based on metadata or connectivity) if the specific flow meter input is available (e.g., if a flow meter or sensor is communicatively coupled with the edge device 204).

Process 600 includes determining if all dependencies of the particular model or application are available (step 608), according to some embodiments. In some embodiments, if all the dependencies for the particular model or application are available (step 608, "YES"), process 600 proceeds to step 610. If one or more of the dependencies for the particular model or application are unavailable (step 608, "NO"), process 600 proceeds to step 614.

Process 600 includes instantiating or running the particular model or application (step 610) and notifying a user that the model or application can be run (step 612) (e.g., that all required dependencies are available or met), according to some embodiments. In some embodiments, steps 610 and 612 are performed in response to determining that all dependencies are available for the particular model or application (e.g., in response to step 608, "YES"). Step 610 can include initiating, populating, instantiating, etc., the model or the application on the edge device 204 and can be performed by the edge device 204 or the device that will run the model or the application. Step 612 can include operating one of workstations 208 to provide the notification to the user that the model or application can be run (e.g., to notify the user that all dependencies have been met).

Process 600 includes determining one or more resolution actions to meet all dependencies (step 614), according to some embodiments. In some embodiments, step 614 is performed in response to determining that one or more dependencies have not been met or unavailable (step 608, "NO"). In some embodiments, step 614 includes determining various actions that can be performed so that all required dependencies of the particular model or application can be met. For example, step 614 may include determining other locations that required input data can be obtained from. Likewise, step 614 can include determining that a simulated input can be instantiated to meet all the dependencies for the particular model or application. For example, if the particular model or application requires a flow meter input to run, step 614 can include determining that a virtual flow meter may be instantiated to run the particular model or application.

Process 600 includes prompting the user to perform the one or more resolution actions (step 616) and/or automatically performing the one or more resolution actions (step 618), according to some embodiments. For example, step 616 can be performed by one of workstations 208 and may include displaying a prompt to the user to initiate the one or more resolution actions or requesting permission to automatically perform the one or more resolution actions (e.g., notification and request to perform step 618). For example, if step 614 results in determining that a virtual flow meter should be implemented on the edge device 204, step 616 can include prompting the user to initiate the virtual flow meter, notifying the user that the virtual flow meter will be used since an actual flow meter is unavailable, or requesting permission to use the virtual flow meter. It should be understood that while a flow meter is given as an example for process 600, this is for illustrative purposes only, and may apply to various other data inputs (e.g., pump pressure, well pressure, flow rates, temperature readings, pressure readings, etc.).

It should be understood that while process 600 is described as being performed locally (e.g., by processing circuitry of one of edge devices 204), process 600 may also be, at least partially, performed remotely by cloud computing system 202. In some embodiments, various steps, functionality, techniques, etc., of process 600 are performed in a distributed manner (e.g., across cloud computing system 202 and various edge devices 204 or field controllers 210).

Resource Availability

Figure 7:
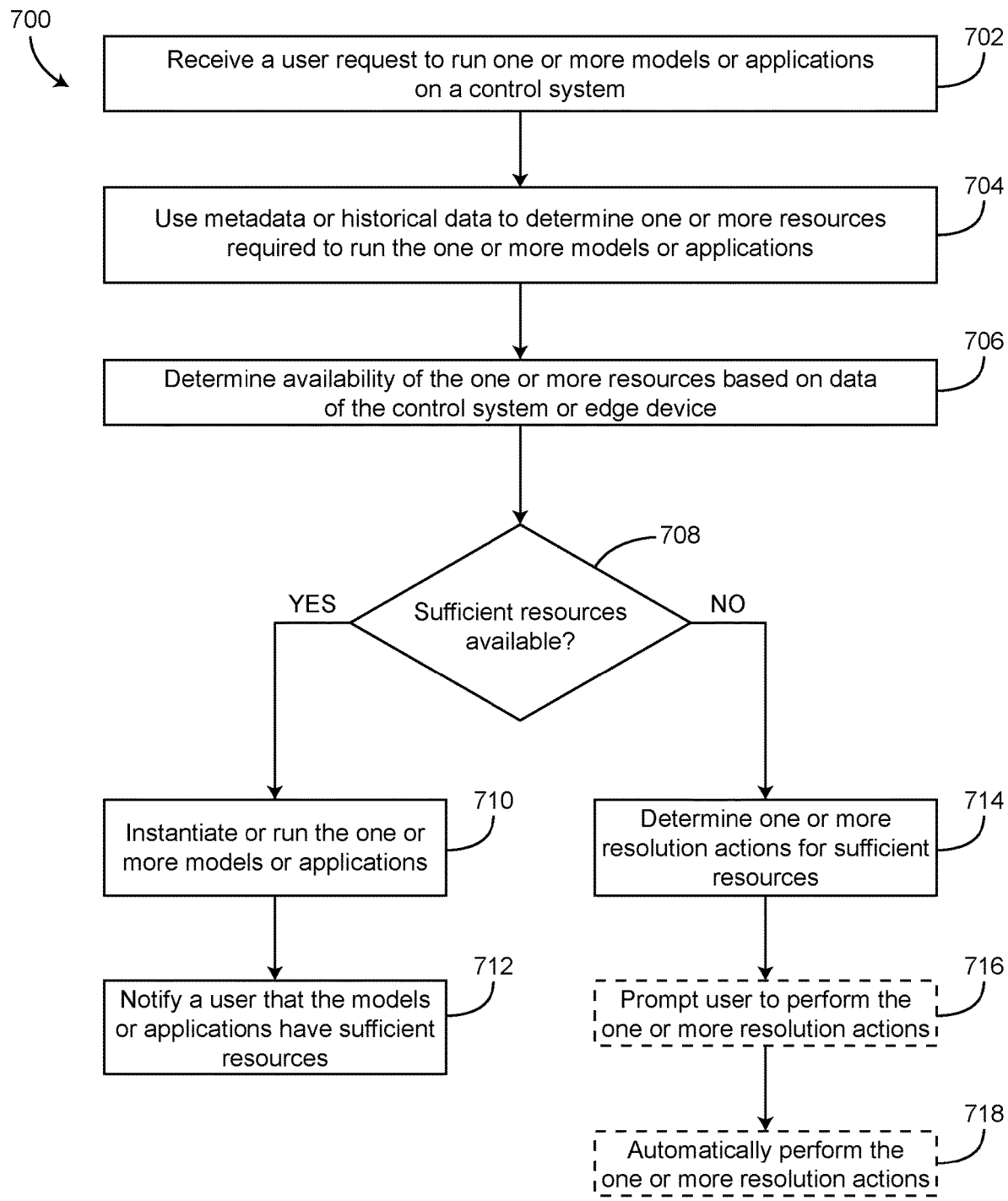
FIG. 7 is a flow diagram of a process for defining and using resources requirements to facilitate proper resource use by applications of the control system of FIG. 2, according to some embodiments.

Referring particularly to FIG. 7, a process 700 for defining and using system variables (e.g., resource requirements) within metadata to facilitate proper resource use by applications is shown, according to some embodiments. Process 700 includes steps 702-718 and can be performed by cloud computing system 202, edge devices 204, etc., or any combination thereof. The resource requirements for various edge devices 204 or applications or models that are used by or run on the edge devices may include any of memory, processing cycles, storage, network bandwidth, or physical resources such as available inputs/outputs and data sources. Advantageously, process 700 can be performed to pre-emptively notify a user that an application or model may have insufficient resources and one or more corrective actions that can be taken so that the application or model has sufficient resources to be implemented.

Process 700 includes receiving a user request to run one or more models or applications on a control system (step 702), according to some embodiments. In some embodiments, the request is received from one of workstations 208. In some embodiments, the request is received from any networked device (e.g., user input device) of control system 200 or from cloud computing system 202. The request may be to initiate and run or implement one or more models, applications, functions, features, etc.

Process 700 includes using metadata or historical data to determine one or more resources required to run the one or more models or applications (step 704), according to some embodiments. In some embodiments, step 704 includes using metadata or known data of the models or applications that indicate required resources (e.g., a required amount of memory, processing cycles, storage, network bandwidth, inputs/outputs, inclusivity/exclusivity, etc., for the application or models to run properly) to identify required amounts of resources for the application or model to run properly (e.g., to reduce latency, or to facilitate proper function).

Process 700 includes determining an availability of the one or more resources based on data of the control system or an edge device where the models or applications will be run (step 706), according to some embodiments. In some embodiments, each application or model provides or defines its requirements based on a list of given resources or prerequisites. Each system, device, processor, etc., that the application may run on can define available resources and ways in which available resources can be shared. For example, a particular physical port may be designated to a certain task while bandwidth may be shared to some degree between devices of control system 200. In some embodiments, control system 200 may self-describe available resources.

Process 700 includes determining if sufficient resources are available to properly implement the one or more models or applications (step 708), according to some embodiments.

In some embodiments, step 708 includes comparing the available resources (e.g., shared and/or non-shared resources) to the required resources for implementation of the one or more models or applications. If sufficient resources are available (e.g., non-shared resources, and/or shared and non-shared resources) (step 708, "YES"), process 700 proceeds to step 710. If sufficient resources are not available (step 709, "NO"), process 700 proceeds to step 714.

Process 700 includes instantiating or running the one or more models or applications (step 710), according to some embodiments. In some embodiments, step 710 is performed in response to determining that sufficient resources are available (step 708, "YES").

Process 700 includes notifying a user that the models or applications have sufficient resources and that the models or applications can be implemented (step 712), according to some embodiments. In some embodiments, step 712 includes operating one of workstations 208 to provide a display or a notification to a user that the requested models or applications can be implemented with sufficient resources.

Process 700 includes determining one or more resolution actions to achieve sufficient resources (step 714), according to some embodiments. In some embodiments, step 714 is performed in response to determining that there are not sufficient resources currently available to implement the one or more models or applications (step 708, "NO"). Step 714 can include determining if resources can be shared to satisfy the resource requirements of the models or applications. If the resource requirements cannot be met for the models or applications, even if resources are shared, process 700 may proceed to a step of notifying a user (e.g., by operation of one or more workstations 208) that additional resources are required to implement the models or applications, and may provide the user suggestions of actions that can be taken to satisfy the resource requirements (e.g., installation of additional equipment, re-configuration, etc.).

Process 700 includes prompting a user to perform the one or more resolution actions (step 716), according to some embodiments. In some embodiments, step 716 is optional and step 718 can be performed instead. In some embodiments, step 716 includes operating one of the workstations 208 of control system 200 to notify a user regarding actions that can be taken to satisfy the resource requirements for the one or more applications or models.

Process 700 includes automatically performing the one or more resolution actions (step 718), according to some embodiments. In some embodiments, for example, resources may be shared across devices of control system 200 without requiring the user to implement physical changes to the control system 200 (e.g., add a specific module for additional analog inputs). In some embodiments, step 718 is optional.

Steps 704-710, 714, and 718 can be performed by any device, processor, processing circuitry, etc., of control system 200, or distributed across multiple devices, processors, processing circuitry, etc., of control system 200. For example, steps 704-710 and 714 can be performed by cloud computing system 202.

Configuration Tool

Figure 8:
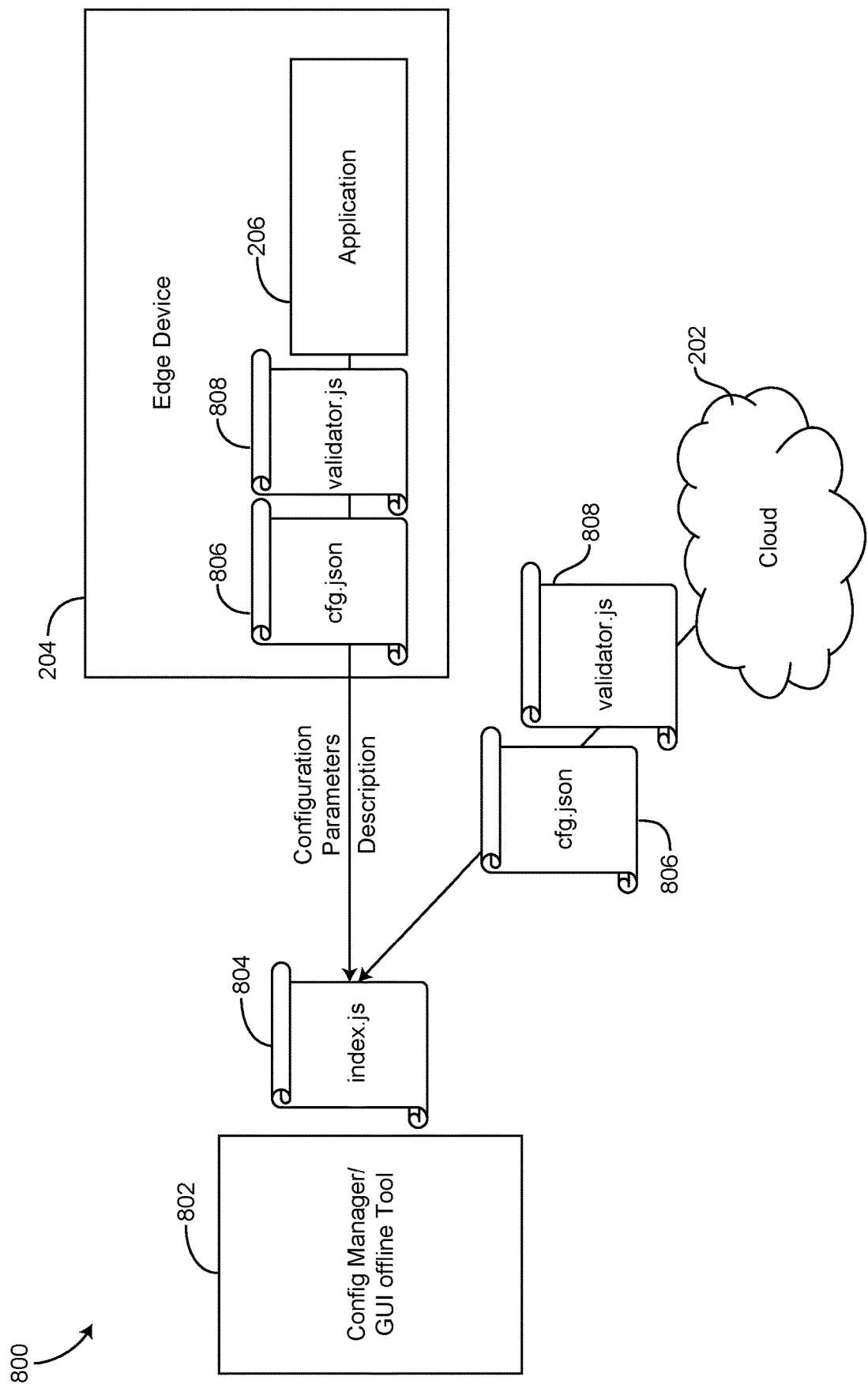
FIG. 8 is a block diagram of a configuration tool system for the control system of FIG. 2, according to some embodiments.

Referring particularly to FIG. 8, a configuration tool system 800 is shown, according to some embodiments. In some embodiments, configuration tool system 800 can be used to perform a process or method to automatically present required parameters (e.g., for an application) to an end user by leveraging self-description/sharing/provision of required configuration parameters and their associated limits for an application (e.g., application 206).

The deployment of configuration software for field devices may be time consuming. Additionally, adding many application to a field device (e.g., edge device 204) may significantly add to this effort. Further, challenges occur with ensuring limits and checks applied to configuration parameters in the software match limits and checks applied internally in application 206. This can further be complicated by new versions of application 206 that require updates to the limits, parameters, and/or checks. Some systems may partially address these issues through plug-in architectures, however, this solution does not scale sufficiently or address the difficulties caused by the new versions of application 206.

Referring still to FIG. 8, edge device 204 includes an object file (shown as JSON file 806), a validator 808, and the application 206. The application 206 can include a description of configuration parameters and settings that can be modified. The description can include various details such as data type, limits, units of measure, and/or complex rules for validation. The description provided by the application 206 also includes a definition of if a setting is required based on other settings. For example, the description may define if "output speed setting" is only displayed when "variable speed" mode is enabled. In this way, the settings or parameters may be inter-related in the description.

In some embodiments, configuration tool system 800 includes a configuration manager 802 (e.g., shown as config manager/GUI offline tool) that is configured to perform an index function 804 and receive the description from the application 206 of edge device 204. In some embodiments, the configuration manager 802 is an off-line device or processing circuitry of the control system 200. In some embodiments, configuration manager 802 is a device of control system 200. In some embodiments, configuration manager 802 is configured to store a pre-distributed or predetermined copy of various parameters for the applications 206 or specific versions that are supported. In some embodiments, configuration manager 802 is configured to communicate with application 206 to request the description. In some embodiments, configuration manager 802 is configured to run validation logic (e.g., validation logic performed by validator 808), either in an agent or as part of the application 206 that a set of parameters belongs to. For example, the validation logic may be a JavaScript Object Notation (JSON) file containing parameters and their properties and a JavaScript file that contains logic for validation of the parameters. In some embodiments, configuration manager 802 can communicate with cloud computing system 202 (where a similar object file 806 and validator 808 are implemented). In some embodiments, validation rules are written at configuration manager 802. In some embodiments, cloud computing system 202 is configured to perform the functionality of configuration manager 802 as described herein. Configuration manager 802 may be configured to generate a graphical user interface (GUI) and present the GUI to a user (e.g., via one of workstations 208, a user device, a user interface device, a display device, etc.). In some embodiments, the GUI includes required configuration parameters and associated limits for the application 206.

Advantageously, configuration tool system 800 as described herein can allow configuration software to be as generic as possible by consuming the required configuration parameters and validation rules from the application 206.

Advantageously, this allows functionality of the application 206 to be extended or modified without changing the configuration software before being applied.

Application Packaging

Figure 9:
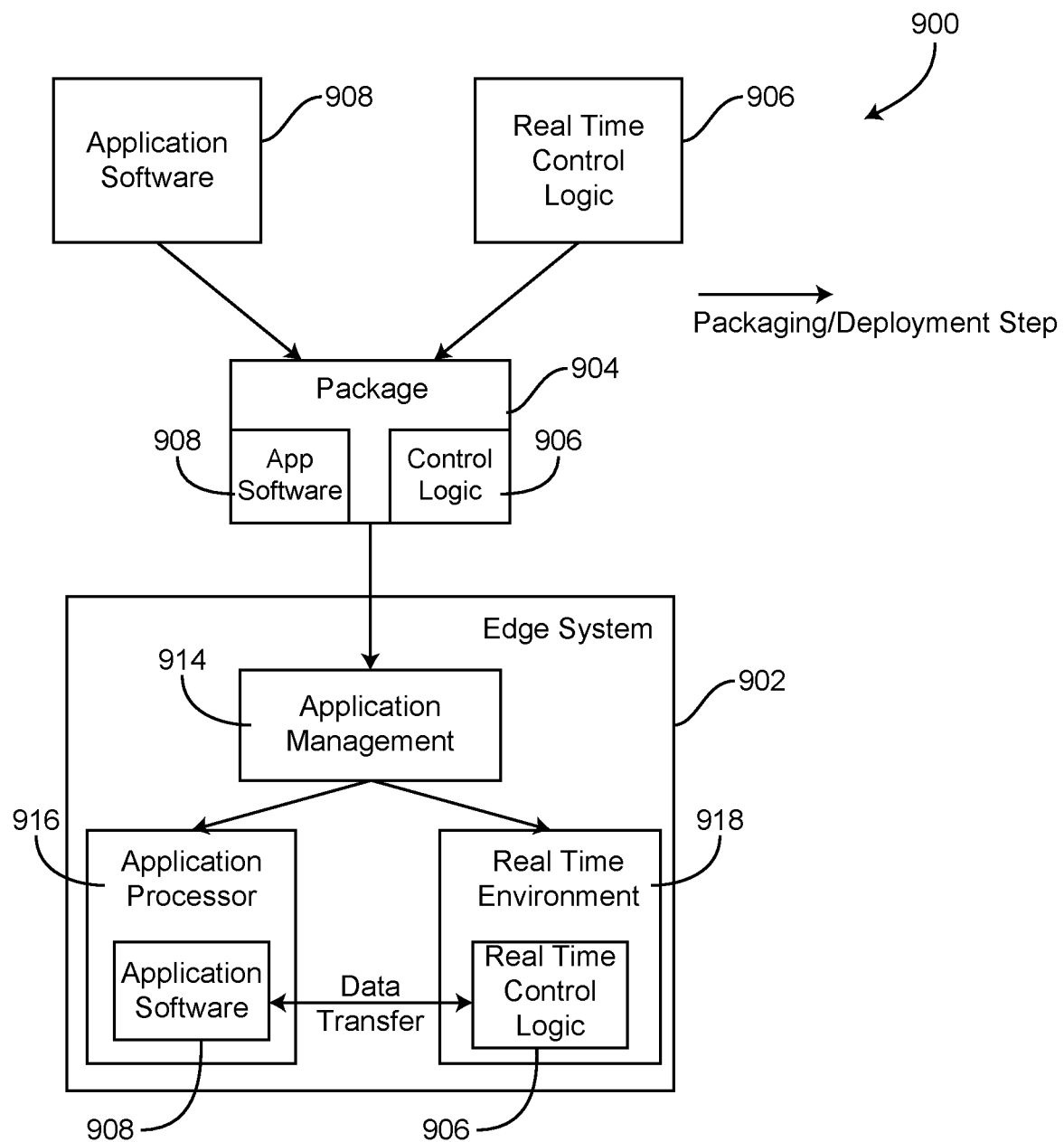
FIG. 9 is a block diagram of an application packaging system of the control system of FIG. 2, according to some embodiments.

Referring particularly to FIG. 9, an application packaging system 900 is shown, according to some embodiments. Application packaging system 900 can be implemented in control system 200. In some embodiments, certain edge devices 204 may include separate processors (e.g., one for computation and connectivity, and another for real-time control). The application packaging system 900 can be implemented to consolidate and correctly apply components of an application (e.g., application 206) that may be required to run on both platforms.

Referring still to FIG. 9, application packaging system 900 includes application software 908, and real-time control logic 906 that are packaged (e.g., merged, combined, etc.) into a package 904. Application packing system 900 also includes an edge system 902, according to some embodiments. In some embodiments, edge system 902 is a collection or combination of edge devices 204. In some embodiments, the application software 908 and real-time control logic 906 are packaged or combined into the package 904 by cloud computing system 202. In some embodiments, an application of one of edge devices 204 is configured to perform the packaging step to combine application software 908 and real-time control logic 906 into package 904. Package 904 can be provided to edge system 902. More specifically, package 904 that includes both application software 908 and real-time control logic 906 can be provided to an application manager 914 of edge system 902. Application manager 914 can be implemented or performed on any of edge devices 204.

Referring still to FIG. 9, application manager 914 is configured to receive the package 904 (e.g., from cloud computing system 202 or the device that performs the packaging/deployment step), and distribute portions of the package (e.g., code portions) to an application processor 916 and a real-time environment processor 918 as required. In some embodiments, the package 904 is a containerized file that includes both the application software 908 and the real-time control logic 906. In some embodiments, application manager 914 is configured to distribute necessary code to the application processor 916 and the real-time environment processor 918 and perform necessary functions to integrate the necessary code with existing code base of application processor 916 and real-time environment processor 918, respectively. In some embodiments, any of the functionality of application packaging system 900 is performed in real-time. In some embodiments, after the application software 908 and the real-time control logic 906 are distributed or deployed to the application processor 916 and the real-time environment processor 918, respectively, data transfer may occur between the application processor 916 and the real-time environment processor 918. The package 904 (e.g., a containerized application) can include an information model needed for a real-time system, as well as real-time applications and necessary rules.

Advantageously, application packaging system 900 provides a seamless way to apply complex applications to edge devices 204 without exposing a user to any additional configuration. Application packaging system 900 also provides a framework for incorporating applications across different platforms or architectures. Application packaging system 900 can provide advantages in edge deployment, or for control systems for hydrocarbon sites 100 with modular components. Application packaging system 900 can provide a method or process for packaging application components designed for general computational hardware and real-time components by distributing the application components (e.g., the application software 908 and/or the real-time control logic 906) in a single package (e.g., package 904). In some embodiments, application packaging system 900 provides a method or process to interpret real-time components within an application, consolidate, and distribute the real-time components.

Temporary Access Keys

Figure 10:
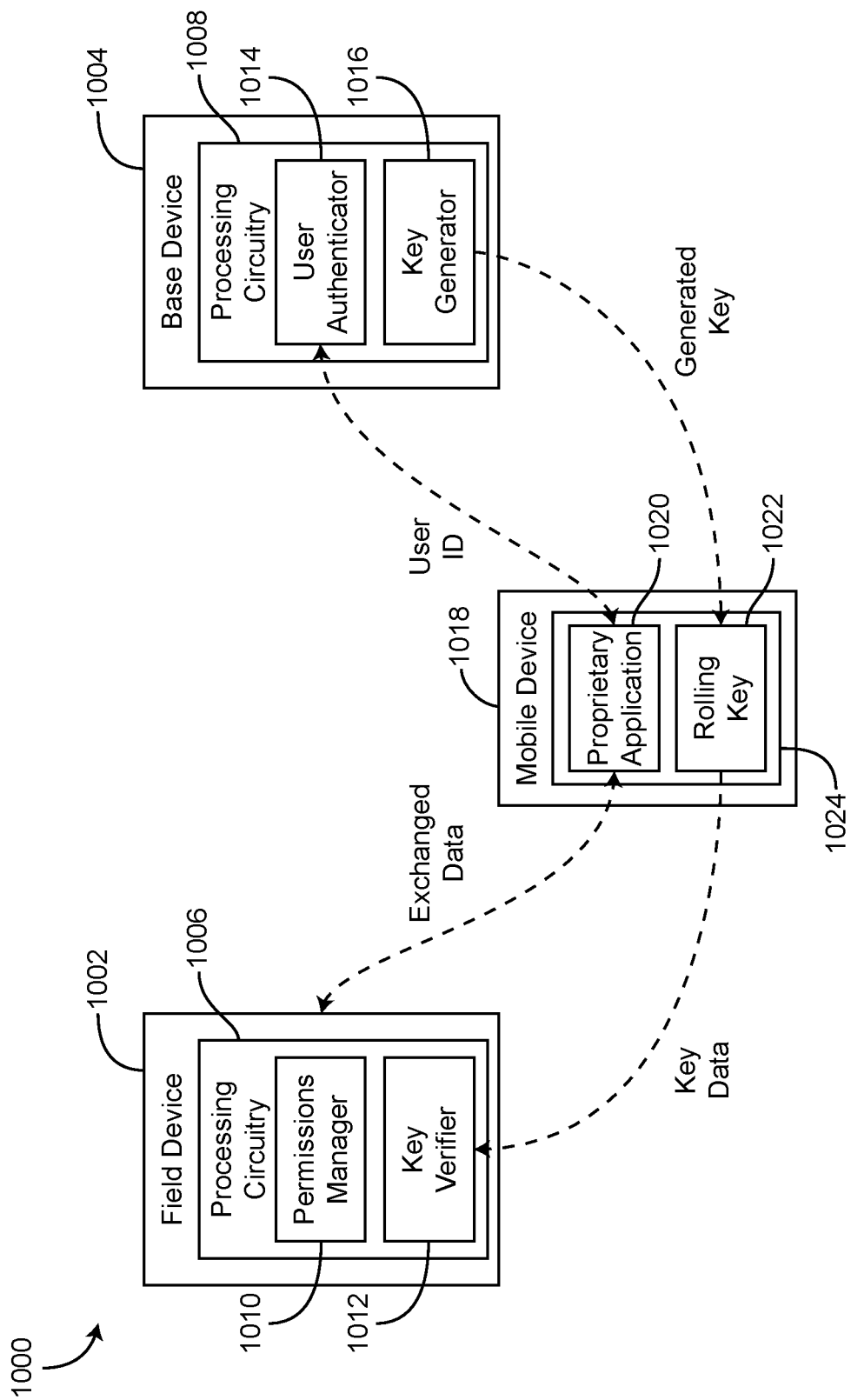
FIG. 10 is a block diagram of a key system for field devices of the control system of FIG. 2, according to some embodiments.

Referring particularly to FIG. 10, a key system 1000 for various devices of control system 200 is shown, according to some embodiments. Key system 1000 can facilitate generating and using temporary keys (e.g., cryptographic keys) to facilitate timed or temporary access of field devices 1002 that may be remotely positioned (e.g., out of communications distance) with a base device 1004. In some embodiments, field device 1002 is any of the edge devices 204, field controllers 210, or field equipment 310 of control system 200 of hydrocarbon site 100.

Key system 1000 includes a mobile device 1018 (e.g., a user device, a technician device, a smartphone, etc.), field device 1002, and base device 1004. In some embodiments, mobile device 1018 includes processing circuitry 1024 that is configured to run a proprietary application 1020 (e.g., a mobile application). The proprietary application 1020 can facilitate bidirectional wireless communication between the mobile device 1018 and base device 1004 or field device 1002. In some embodiments, the mobile device 1018 includes a wireless transceiver, cellular dongle, etc., that is configured to communicate with the base device 1004 or the field device 1002 using a variety of wireless communications protocols (e.g., Bluetooth, near-field-communication, etc.). In some embodiments, the mobile device 1018 is configured to wiredly communicate with at least one of the base device 1004 or the field device 1002.

When the mobile device 1018 is positioned at the base device 1004 (e.g., at a base location of hydrocarbon site 100), the proprietary application 1020 can operate the wireless transceiver the establish communication with the base device 1004. The base device 1004 may include processing circuitry 1008 including a user authenticator 1014 and a key generator 1016. In some embodiments, the proprietary application 1020 is configured to communicate a user or technician identifier to the user authenticator 1014 of the base device 1004. The user authenticator 1014 can use the user ID to determine if the technician should have access to various field devices. If the technician should have access to view, update, or modify data (e.g., configuration data) of the field device 1002, the key generator 1016 may generate a key for the technician and provide the generated key to the mobile device 1018, where the mobile key is stored as a rolling key 1022 (e.g., in memory of the mobile device 1018).

When the technician is proximate or nearby field device 1002 (e.g., at a remote location in hydrocarbon site 100), the proprietary application 1020 can establish communication between the mobile device 1018 and the field device 1002. The field device 1002 can include processing circuitry 1006 including a permissions manager 1010 and a key verifier 1012. In some embodiments, the mobile device 1018 is configured to scan a graphical or visual representation of data that is suitable for reading and interpretation by the mobile device 1018 via an image sensor. In some embodiments, the graphical or visual representation of data is a quick response (QR) code. In some embodiments, the graphical or visual representation of data is a 1D barcode, a 2D QR code, or any other suitable visual or graphical representation that can be scanned by the image sensor of the mobile device 1018. In some embodiments, the graphical or visual representation of data can be scanned by the mobile device 1018 to establish communication with the field device 1002.

In some embodiments, the field device 1002 includes a speaker and is configured to output an audio signal (e.g., an audible signal, an ultrasonic signal, etc.) that can be read by a microphone or sound detector of the mobile device 1018 (e.g., a mobile device, a tablet, or any other computing device including a microphone). In some embodiments, the audio signal encodes data of the field device 1002 for transfer to the mobile device 1018 without requiring a common networking interface or wired or wireless interface.

In some embodiments, the proprietary application 1020 is configured to use a cellular dongle of the mobile device 1018 to communicate with a server to determine if the technician should have access to the field device 1002. In some embodiments, the mobile device 1018 provides the rolling key 1022 (e.g., key data) to the field device 1002. The field device 1002 uses the key data (e.g., at the key verifier) to determine if the key data indicates that the technician should have access to the field device 1002. If the technician has proper authorization to access the field device 1002 (e.g., as determined by the key verifier 1012), the permission manager 1010 may enable the proprietary application 1020 of the mobile device 1018 to exchange data (e.g., configuration data, diagnostic data, troubleshooting data, operational data, etc.) with the field device.

In some embodiments, the key is a token key, a time based key, a temporary key, a secret based key, or any combination thereof. In some embodiments, the key only provides the technician (e.g., via the mobile device 1018) with access to the field device 1002 for a limited amount of time (e.g., a day, a week, a month, etc.). In some embodiments, the field device 1002 and/or the mobile device 1018 comprise a global positioning system (GPS) sensor that is configured to accurately determine a time of day to facilitate timed access to the field device 1002 by the mobile device 1018. Advantageously, key system 1000 facilitates security for field device 1002 even if field devices 1002 are out of communications range with base device 1004.

In some embodiments, the key is a temporary key. In some embodiments, the secret key is any of a time base key, a token key, or a secret based key. In some embodiments, the key is algorithmically generated in the field device 1002 or at the base device 1004 by combining both an algorithm and one or more additional inputs from an edge device (e.g., one of edge devices 204, the field device 1002) such as a real-time clock, a global position, an input or signal received from another device or computer, etc., or any combination thereof. For example, the key may be generated using both the clock of the field device 1002 or base device 1004 combined with an input received from a user's hand held device (e.g., the mobile device 1018) or a user-entered string (e.g., entered via the mobile device 1018).

Load Balancing

Figure 11:
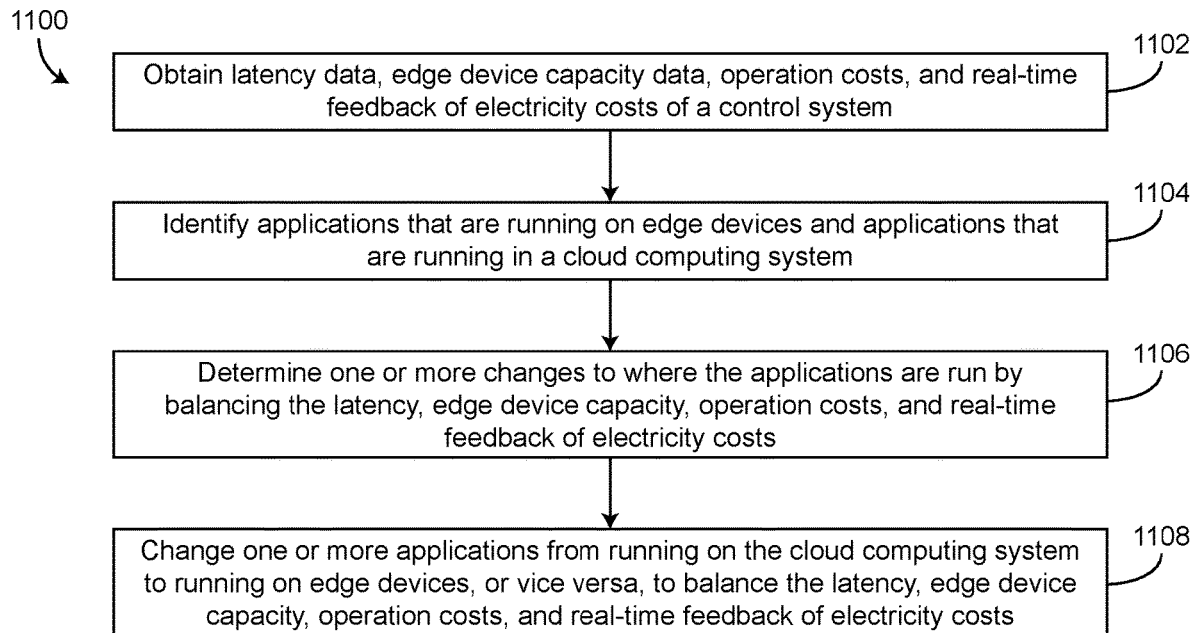
FIG. 11 is a flow diagram of a process for balancing various loads (e.g., computational or system operational loads) of the control system of FIG. 2, according to some embodiments.

Referring particularly to FIG. 11, a process 1100 for balancing various loads (e.g., computational or system operational loads) of control system 200 is shown, according to some embodiments. Process 1100 includes steps 1102-1108 and can be performed by cloud computing system 202 (e.g., in the cloud) or by one or more edge devices 204 of control system 200.

Process 1100 includes obtaining latency data, edge device capacity data, operating costs, and real-time feedback of electricity costs of a control system (step 1102), according to some embodiments. In some embodiments, step 1102 is performed by cloud computing system 202 by monitoring metadata of control system 200 or of edge devices 204. In some embodiments, step 1102 includes monitoring operational characteristics of edge devices 204 (e.g., latency time). In some embodiments, step 1102 includes obtaining or receiving metadata from each of the edge devices 204 of control system 200 that indicates edge device capacity. In some embodiments, step 1102 includes receiving electricity cost data from a server (e.g., an energy provider server) or a database.

Process 1100 includes identifying one or more applications that are currently running on edge devices and one or more applications that are currently running in a cloud computing system (e.g., in cloud computing system 202) (step 1104), according to some embodiments. Process 1100 also includes determining one or more changes to where the applications are running by balancing the latency, edge device capacity, operating costs, and real-time feedback of electricity costs (step 1106), according to some embodiments. In some embodiments, step 1106 is performed using a set of criteria and/or a CDST model. In some embodiments, step 1106 includes using a model that indicates a weighted operating cost (e.g., an objective function) and minimizing the objective function. For example, the objective function may indicate latency, operating costs, or electrical energy costs as a variable to be optimized, and the edge device capacity may be a constraint for the objective function. In some embodiments, various prediction models of the control system 200 are used to predict latency, operating costs, or electrical energy costs.

Process 1100 includes changing one or more applications from running on the cloud computing system to running on edge devices, or vice versa, to intelligently balance the latency, edge device capacity, operating costs, and electricity costs (step 1108), according to some embodiments. In some embodiments, step 1108 includes using the results of step 1106 to adjust where various applications are run (e.g., whether locally or in the cloud) to balance latency, edge device capacity, operating costs, and electricity costs.

Figure 12:
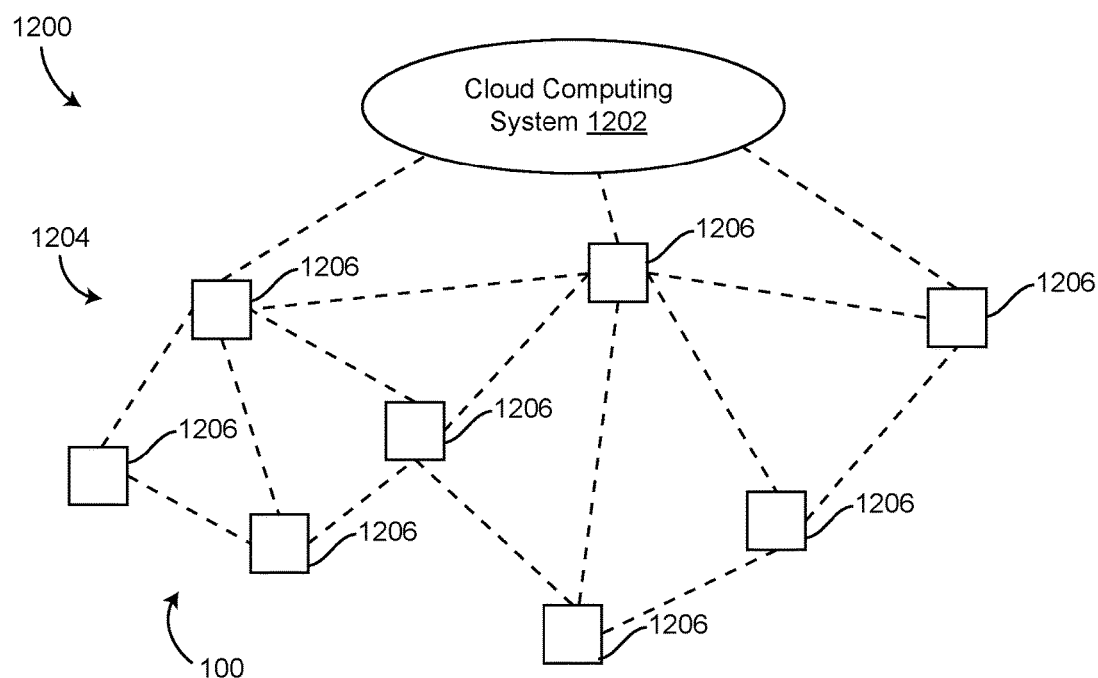
FIG. 12 is a block diagram of a mesh network system for the hydrocarbon site of FIG. 1, according to some embodiments.

Referring particularly to FIG. 12, a system 1200 for hydrocarbon site 100 is shown, according to some embodiments. System 1200 includes a mesh network 1204 formed by mesh devices 1206 (e.g., edge devices 204, field controllers 210, etc.) and a cloud computing system 1202 (e.g., cloud computing system 202). In some embodiments, cloud computing system 1202 is configured to aggregate computational resources and allow for applications performed by the mesh devices 1206 (e.g., edge devices 204) to be deployed to edge devices to coordinate to solve a specific operational problem (e.g., a production of a particular well, power consumption, etc.). In some embodiments, cloud computing system 1202 is configured to determine the deployment of the applications using process 1100. In some embodiments, cloud computing system is configured to determine the deployment of the applications to solve the specific operational problem by using compute power (e.g., available compute power of the mesh devices 1206 of mesh network 1204), optimizing computation across the mesh network 1204, distributing applications to different mesh devices 1206 of the mesh network 1204 to align with available compute power, while accounting for redundancy. In some embodiments, the mesh network devices 1206 are linked so that each mesh network device 1206 may understand contexts of other mesh network devices 1206. In some embodiments, cloud computing system 1202 is configured to use metadata of available resources of mesh network 1204 to optimize collections of data pools or to optimize processing (e.g., processing speed).

In some embodiments, mesh network 1204 is a low latency network that allows for data sharing between mesh network devices 1206, thereby facilitating quicker optimization. In some embodiments, cloud computing system 1202 is configured to perform an optimization to adjust operation of well devices of the hydrocarbon site 100 (e.g., positioned at different locations) to produce a standing wave and maximize or optimize production of a particular well device. Advantageously, mesh network 1204 provides rapid data sharing and low latency to facilitate real-time optimization of production of the hydrocarbon site 100 (e.g., oil production, pumping production, etc.). In some embodiments, mesh network 1204 is a 5G network. In some embodiments, mesh network 1204 is a private network (e.g., a high speed mesh network that interconnects the mesh network devices 1206 or edge devices 204).

Metadata Quality Analysis

Figure 13:
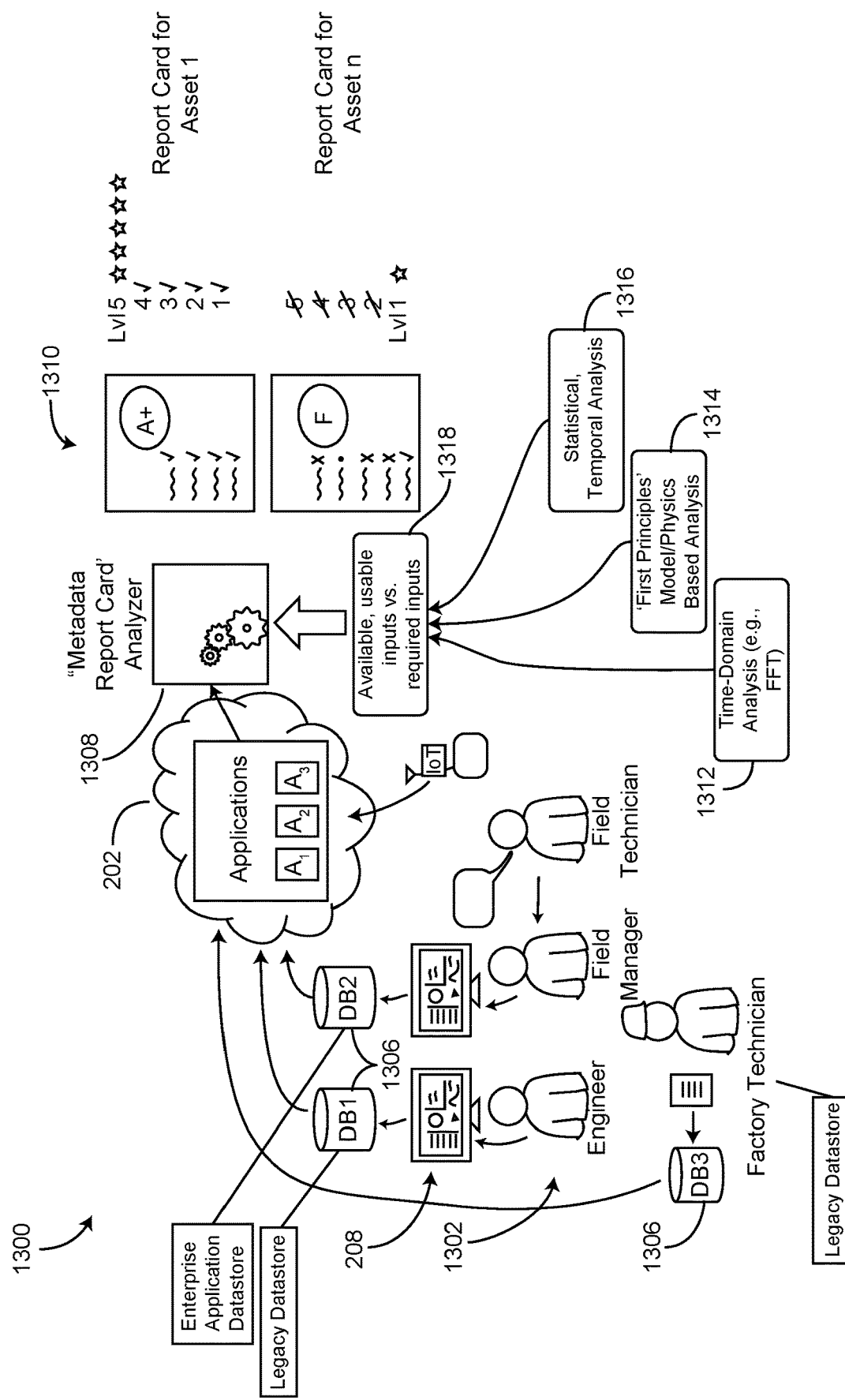
FIG. 13 is a block diagram of metadata quality analysis system for the control system of FIG. 2, according to some embodiments.

Referring now to FIG. 13, a metadata quality analysis system 1300 is shown, according to some embodiments. In some embodiments, metadata quality analysis system 1300 can be configured to perform a method or a process to scan data associated with a device or application (e.g., asset metadata) and determine completeness and quality of the data by assessing the data that is available in comparison to pre-requisites for a given application/use. In some embodiments, any of the functionality of metadata quality analysis system 1300 is performed by control system 200. For example, metadata quality analysis system 1300 may be integrated with control system 200.

Metadata quality analysis system 1300 includes various databases 1306, workstations 208, cloud computing system 202, and a metadata analyzer 1308 that is configured to output metadata report cards 1310 (e.g., for different assets), according to some embodiments. In some embodiments, metadata can be monitored, surveilled, or optimized to enable better hazard management or mitigation, enable additional value-added services such as event detections, or model-based outputs such as virtual flows, digital twins, and advanced analyses. Often times data is captured in a manual, laborious process, with little or no data checks. Advantageously, metadata quality analysis system 1300 as described herein provides a quality check to ensure that the metadata is of sufficient quality before being used in higher level data analyses.

For example, users 1302 (e.g., an engineer, a field manager, a field technician, a factory technician, etc.) may input data to databases 1306 (e.g., via workstations 208), which is then provided to cloud computing system 202. Cloud computing system 202 may provide data to the metadata analyzer 1308. Metadata analyzer 1308 can perform a series of checks or operations in sequence and/or parallel to generate a report card. In some embodiments, metadata analyzer 1308 uses any of a time-domain analysis 1312 (e.g., a Fast Fourier Transform), a "first principles" model/physics based analysis 1314, and/or a statistical temporal analysis 1316 to determine available, usable inputs and/or required inputs, or to determine the report cards 1310. In some embodiments, the operations performed by metadata analyzer 1308 to generate the report cards 1310 include a data quality analysis to identify frozen data, stale data, or data that is out of bounds. In some embodiments, the operations performed by metadata analyzer 1308 to generate the report cards 1310 include a temporal resolution analysis (e.g., using hour data or minute data). In some embodiments, the operations performed by metadata analyzer 1308 to generate the report cards 1310 include valid values for each categorized attribute of the data. In some embodiments, the operations performed by metadata analyzer 1308 to generate the report cards 1310 include determining if values of the data are within acceptable ranges (e.g., minimum and maximum ranges).

The report cards 1310 generated by metadata analyzer 1308 can each be associated with a different asset (e.g., a different piece of equipment, a different edge device, a different field controller, etc.) and may indicate a metadata quality of the associated asset. In some embodiments, the report cards 1310 include scores that indicate a quality of the metadata for the associated asset. In some embodiments, assets that meet a minimum quality threshold may have specific capabilities or services enabled with confidence, while assets that have a report card 1310 indicating lower quality metadata (e.g., below the minimum quality threshold) may be flagged as having low-confidence results.

Application Backup and Restore

Figure 14:
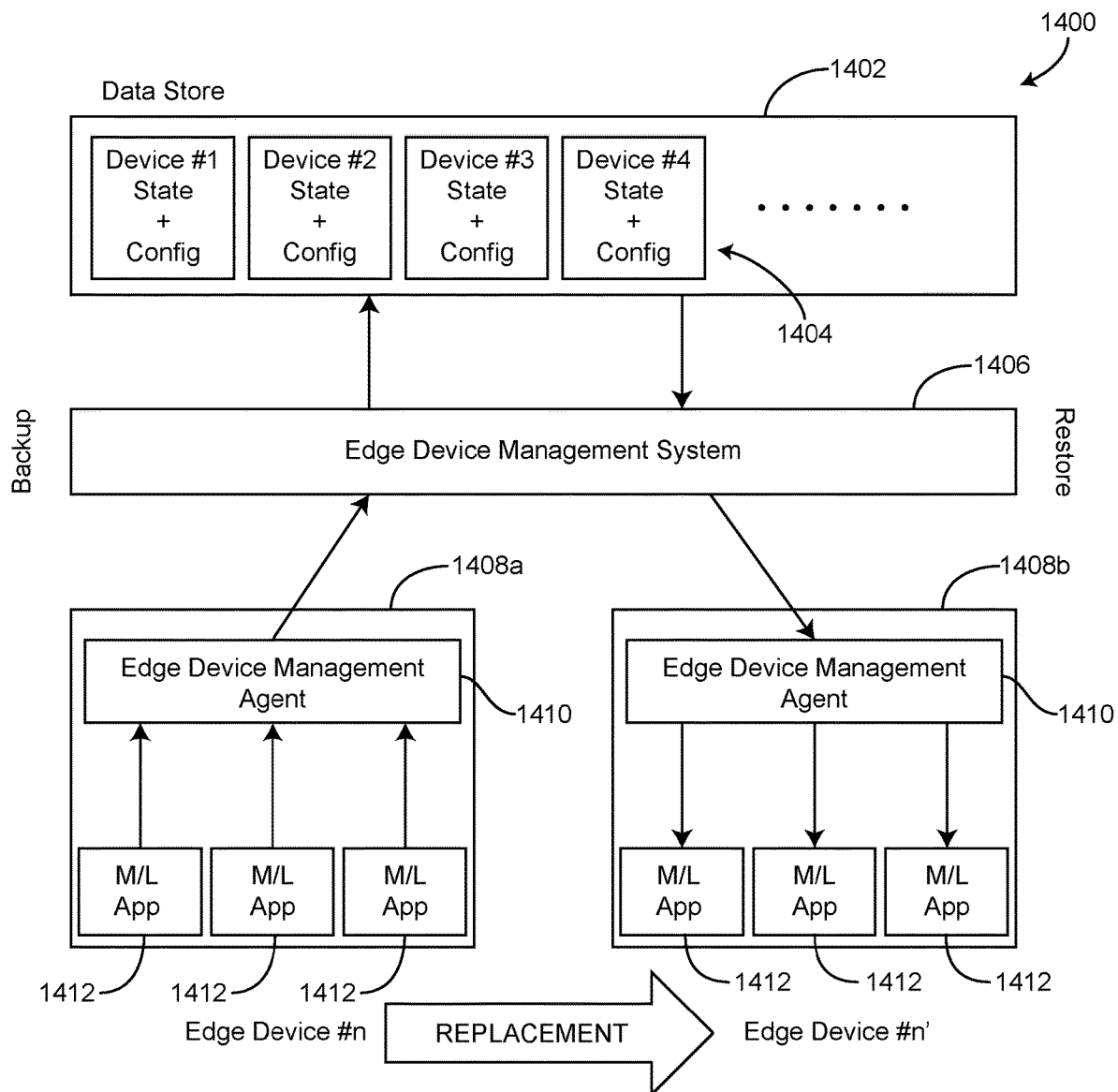
FIG. 14 is a block diagram of a backup and restore system for various edge devices of the control system of FIG. 2, according to some embodiments.

Referring particularly to FIG. 14, a backup and restore system 1400 is shown. Backup and restore system 1400 illustrates various backup and restore functionality that can be implemented by control system 200 (e.g., by cloud computing system 202) for edge devices 204 of control system 200. When one of edge devices 204 is replaced and applications are deployed to run on the edge device 204, the applications may lose learning acquired over previous runtime. This can result in a loss of learning (ML/DL) data. Advantageously, the backup and restore functionality illustrated by backup and restore system 1400 can be performed by control system 200 so that a state and configuration of each edge device 204 can be backed up and stored in data storage 1402, and restored to a new device (e.g., edge device #n') when the new edge devices comes online. Edge devices 204 may disconnect due to connectivity issues, provisioning of new devices, hardware updates, decommissioning, etc. In some embodiments, backup and restore system 1400 backs up and restores execution state and configuration of edge devices 204 in order to maintain execution state or learning by storing state information of the applications in a managed or centralized location (e.g., in data storage 1402). In some embodiments, the backup and restore operations of backup and restore system 1400 are performed periodically so that device states and configuration (and learning) that are stored in data storage 1402 are updated or overwritten at periodic intervals. In some embodiments, all edge devices 204 that are connected in control system 200 are periodically backed up to data storage 1402.

Backup and restore system 1400 includes an edge device 1408 (e.g., edge device 204), according to some embodiments. Specifically, FIG. 14 illustrates backing up state and configuration from an old or previous edge device 1408*a* and restoring or writing the state and configuration of the previous edge device 1408*a* to a new edge device 1408*b*. Edge device 1408 includes various applications 1412 (e.g., applications 206), and an edge device management agent 1410. Edge device management agent 1410 is configured to receive various states, learning data, configuration, etc., of the applications 1412, and provide the states, learning data, or configurations to data storage 1402 via an edge device management server 1406. In some embodiments, edge device management server 1406 writes a backup file 1404 to data storage 1402 for each of edge devices 1408 that are connected (e.g., periodically). If an edge device 1408 is expected to be disconnected (e.g., due to maintenance or replacement), edge device management server and edge device management agent 1410 can operate to update or write a new backup file 1404 in data storage 1402.

Once a new replacement edge device 1408 is provisioned (e.g., new edge device 1408*b*) and brought online, a restore operation can be initiated by backup and restore system 1400 to write the backup file 1404 from the data storage 1402 to the new edge device 1408*b*. Edge device management server 1406 may retrieve an appropriate backup file 1404 from data storage 1402, and provide the backup file to edge device management agent 1410 of the new edge device 1408*b*. Edge device management agent 1410 then writes, updates, or restores the state (e.g., execution state), configuration, or learning to the applications 1412 of new edge device 1408.

Advantageously, the new edge device 1408*b* may function as a "clone" of the previous edge device 1408*a*. Backup and restore system 1400 facilitates a seamless application experience since the applications 1412 and their states are not tied to a specific physical device, and can instead be cloned from one edge device 1408 to another.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hydrocarbon control system comprising:
   a base device comprising a key generator configured to generate a temporary key;
   a field device configured to restrict or allow access based on verification of a received key, the field device positioned in a geographic location that is outside of a communication range of the base device;
   a mobile device configured to:
      communicate with the base device to receive the temporary key when in proximity of the base device, the temporary key generated by the base device based at least partially on the geographic location of the field device;
      communicate with the field device to provide the temporary key to the field device when in proximity of the field device; and
      exchange data with the field device in response to the field device verifying the temporary key.

2. The hydrocarbon control system of claim 1, wherein the temporary key is configured allow access by a user of the mobile device to the field device for a timed duration.

3. The hydrocarbon control system of claim 1, wherein the temporary key is any of a time based key, a token key, or a secret based key.

4. The hydrocarbon control system of claim 1, wherein the field device includes a graphical representation of data, wherein the mobile device is configured to scan the graphical representation of data to establish communication between the field device and the mobile device to facilitate verification of the temporary key and the exchange of data with the field device.

5. The hydrocarbon control system of claim 1, wherein the mobile device comprises a proprietary application, wherein the proprietary application configures the mobile device to communicate wirelessly with the field device and the base device.

6. The hydrocarbon control system of claim 1, wherein the temporary key is generated using an algorithm and an input from an edge device of the hydrocarbon control system.

7. The hydrocarbon control system of claim 1, wherein the temporary key is configured to at least one of:
   allow the mobile device to download data from the field device onto the mobile device;
   allow a user to view data of the field device via the mobile device; or
   allow the user to modify data of the field device via the mobile device.

8. The hydrocarbon control system of claim 1, wherein the field device is configured to control operation of an electric submersible pump.

9. A method for providing temporary access to a field device of a hydrocarbon system, the method comprising steps of:
   receiving a request for a temporary key from a mobile device at a base device when the mobile device is in communications proximity with the base device;
   providing the temporary key by the base device to the mobile device in response to the request, the temporary key generated by the base device based at least partially on a geographical location of the field device;
   providing the temporary key to the field device by the mobile device when the mobile device is in communications proximity of the field device, the field device positioned in a geographic location that is outside of a communication range of the base device;
   verifying the temporary key at the field device; and
   exchanging data between the field device and the mobile device in response to verification of the temporary key.

10. The method of claim 9, wherein the request for the temporary key comprises an ID of a technician of the mobile device, wherein the base device is configured to generate the temporary key based on the ID of the technician to provide an appropriate access level for the technician of the mobile device.

11. The method of claim 10, wherein the temporary key is configured to at least one of:
   allow the mobile device to download data from the field device onto the mobile device;
   allow the technician to view data of the field device via the mobile device; or
   allow the technician to modify data of the field device via the mobile device.

12. The method of claim 9, wherein the temporary key is configured to allow access by a technician to data of the field device for a timed duration.

13. The method of claim 9, wherein the temporary key is any of a time based key, a token key, or a secret based key.

14. The method of claim 9, wherein the field device includes a graphical representation of data, wherein the method further comprises:
- scanning the graphical representation of data of the field device with the mobile device to establish wireless communication between the field device and the mobile device; and
- performing the steps of providing the temporary key, verifying the temporary key, and exchanging data between the field device and the mobile device in response to scanning the graphical representation of data and establishing the wireless communication between the field device and the mobile device.

15. The method of claim 9, wherein the mobile device comprises a proprietary application, wherein the proprietary application configures the mobile device to communicate with the field device and the base device.

16. The method of claim 9, wherein the field device is configured to control operation of an electric submersible pump.

17. A field device for a hydrocarbon site, the field device comprising processing circuitry configured to:
- establish wireless communication between the field device and a mobile device;
- obtain a temporary key from the mobile device, the temporary key being provided to the mobile device previously by a base device of the hydrocarbon site and generated by the base device based at least partially on a geographical location of the field device;
- verify the temporary key and determine an access for a user of the mobile device based on the temporary key; and
- in response to the temporary key being verified, sending data to the mobile device for a limited time duration;

wherein the field device is positioned at the geographical location, the geographical location being outside of a communication range of the base device.

18. The field device of claim 17, further comprising a quick response (QR) code, wherein the QR code is scannable by the mobile device to initiate establishing wireless communication between the field device and the mobile device.

19. The field device of claim 17, wherein the temporary key is generated using an algorithm and an input from an edge device.

20. The field device of claim 17, wherein the data sent to the mobile device comprises any of configuration data, diagnostic data, troubleshooting data, or operational data.

* * * * *